US008400495B2

(12) United States Patent
Kaule

(10) Patent No.: US 8,400,495 B2
(45) Date of Patent: Mar. 19, 2013

(54) SECURITY ELEMENT

(75) Inventor: Wittich Kaule, Emmering (DE)

(73) Assignee: Giesecke & Devrient GmbH, Munich (DE)

(*) Notice: Subject to any disclaimer, the term of this patent is extended or adjusted under 35 U.S.C. 154(b) by 610 days.

(21) Appl. No.: 12/665,834

(22) PCT Filed: Jun. 25, 2008

(86) PCT No.: PCT/EP2008/005174

§ 371 (c)(1),
(2), (4) Date: Dec. 21, 2009

(87) PCT Pub. No.: WO2009/000530

PCT Pub. Date: Dec. 31, 2008

(65) Prior Publication Data

US 2010/0208036 A1 Aug. 19, 2010

(30) Foreign Application Priority Data

Jun. 25, 2007 (DE) ......................... 10 2007 029 204

(51) Int. Cl.
*H04N 7/12* (2006.01)
(52) U.S. Cl. ................. 348/46; 348/40; 348/42; 348/61
(58) Field of Classification Search .................... 348/40, 348/42, 61
See application file for complete search history.

(56) References Cited

U.S. PATENT DOCUMENTS 1,475,430 A 11/1923 Curwen
4,765,656 A * 8/1988 Becker et al. .................. 283/70

(Continued)

FOREIGN PATENT DOCUMENTS

DE 3602563 C1 4/1987
DE 19949542 A1 4/2001

(Continued)

OTHER PUBLICATIONS

Durand F., Photography—Reversible Prints, Integral Photographs, (English translation of article by Lippman), Academy of the Sciences, Mar. 2, 1908 session, 4 pages.

(Continued)

*Primary Examiner* — Sath V Perungavoor
*Assistant Examiner* — Geepy Pe
(74) *Attorney, Agent, or Firm* — Greenlee Sullivan P.C.

(57) ABSTRACT

The present invention relates to a security element for security papers, value documents and the like, having a microoptical moiré magnification arrangement (30) for depicting a three-dimensional moiré image (40) that includes, in at least two moiré image planes spaced apart in a direction normal to the moiré magnification arrangement, image components (42, 44), having a motif image that includes two or more periodic or at least locally periodic lattice cell arrangements having different lattice periods and/or different lattice orientations that are each allocated to one moiré image plane and that include micromotif image components for depicting the image component (42, 44) of the allocated moiré image plane, for the moiré-magnified viewing of the motif image, a focusing element grid that is arranged spaced apart from the motif image and that includes a periodic or at least locally periodic arrangement of a plurality of lattice cells having one microfocusing element each, wherein, for almost all tilt directions ($\vec{k}$), upon tilting the security element, the magnified, three-dimensional moiré image (40) moves in a moiré movement direction ($\vec{v}$) that differs from the tilt direction.

40 Claims, 9 Drawing Sheets

U.S. PATENT DOCUMENTS

Figure 1:
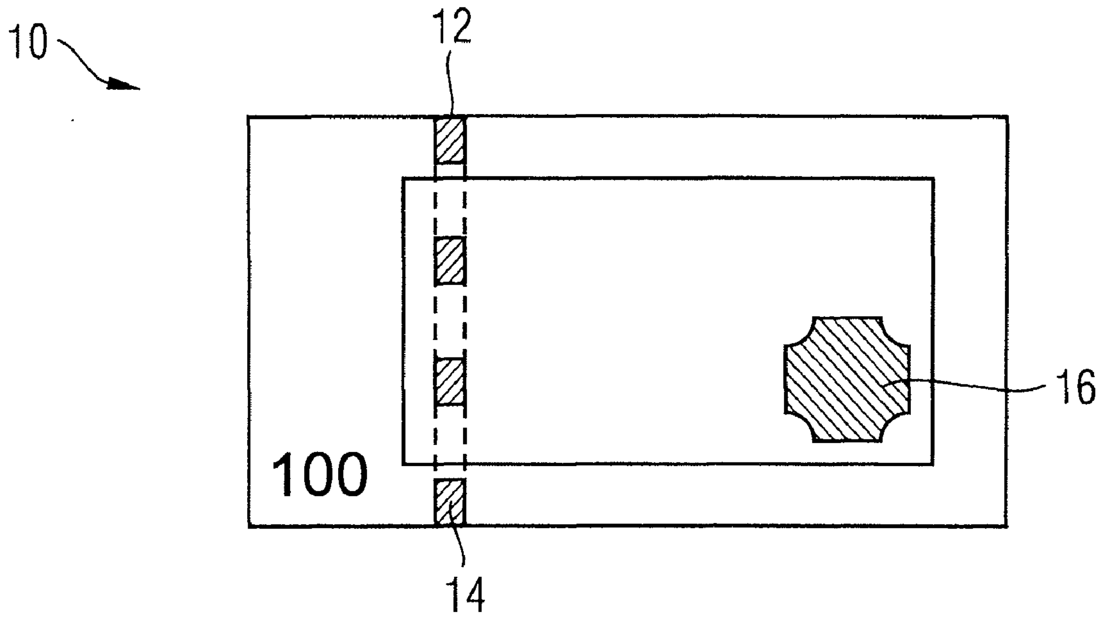

| | | | |
|---|---|---|---|
| 5,712,731 | A | 1/1998 | Drinkwater et al. |
| 5,723,200 | A | 3/1998 | Oshima et al. |
| 5,772,250 | A | 6/1998 | Gasper |
| 6,288,842 | B1 | 9/2001 | Florczak et al. |
| 6,329,040 | B1 | 12/2001 | Oshima et al. |
| 6,450,540 | B1 * | 9/2002 | Kim ................................ 283/91 |
| 7,667,894 | B2 | 2/2010 | Hoffmuller |
| 7,728,931 | B2 | 6/2010 | Hoffmuller |
| 7,808,605 | B2 | 10/2010 | Hoffmuller |
| 7,852,557 | B2 * | 12/2010 | Tamai ........................... 359/463 |
| 7,974,006 | B2 * | 7/2011 | Tamai ........................... 359/463 |
| 7,986,459 | B2 | 7/2011 | Kaule |
| 8,083,894 | B2 | 12/2011 | Gruszczynski |
| 8,149,511 | B2 | 4/2012 | Kaule |
| 2006/0003295 | A1 | 1/2006 | Hersch et al. |
| 2007/0165182 | A1 | 7/2007 | Hoffmuller |
| 2007/0177131 | A1 | 8/2007 | Hansen |
| 2007/0211238 | A1 | 9/2007 | Hoffmuller |
| 2007/0216518 | A1 | 9/2007 | Hoffmuller |
| 2007/0229263 | A1 | 10/2007 | Staub et al. |
| 2007/0229928 | A1 | 10/2007 | Hoffmuller |
| 2007/0241553 | A1 | 10/2007 | Heim |
| 2007/0246933 | A1 | 10/2007 | Heim |
| 2007/0274559 | A1 | 11/2007 | Depta |
| 2008/0014378 | A1 | 1/2008 | Hoffmuller |
| 2008/0037131 | A1 | 2/2008 | Steenblik et al. |
| 2008/0054621 | A1 | 3/2008 | Burchard |
| 2008/0079257 | A1 | 4/2008 | Fessl |
| 2008/0088859 | A1 | 4/2008 | Depta |
| 2008/0160226 | A1 | 7/2008 | Kaule |
| 2008/0163994 | A1 | 7/2008 | Hoppe |
| 2008/0182084 | A1 | 7/2008 | Tompkin et al. |
| 2008/0198468 | A1 | 8/2008 | Kaule |
| 2008/0216976 | A1 | 9/2008 | Ruck |
| 2008/0250954 | A1 | 10/2008 | Depta |
| 2008/0258456 | A1 | 10/2008 | Rahm |
| 2008/0259416 | A1 | 10/2008 | Peters et al. |
| 2009/0001709 | A1 | 1/2009 | Kretschmar |
| 2009/0008923 | A1 | 1/2009 | Kaule |
| 2009/0008926 | A1 | 1/2009 | Depta |
| 2009/0102605 | A1 | 4/2009 | Kaule |
| 2009/0115185 | A1 | 5/2009 | Hoffmuller |
| 2009/0218397 | A1 | 9/2009 | Wild et al. |
| 2009/0236061 | A1 | 9/2009 | Gruszczynski |
| 2009/0290221 | A1 | 11/2009 | Hansen et al. |
| 2009/0297805 | A1 | 12/2009 | Dichtl |
| 2009/0322071 | A1 | 12/2009 | Dichtl |
| 2010/0175843 | A1 | 7/2010 | Gregarek |
| 2010/0177094 | A1 | 7/2010 | Kaule |
| 2010/0182221 | A1 | 7/2010 | Kaule |
| 2010/0194091 | A1 | 8/2010 | Heim |
| 2010/0194532 | A1 | 8/2010 | Kaule |
| 2010/0196587 | A1 | 8/2010 | Keller |
| 2010/0207376 | A1 | 8/2010 | Heim |
| 2010/0208036 | A1 | 8/2010 | Kaule |
| 2010/0307705 | A1 | 12/2010 | Rahm |
| 2010/0308570 | A1 | 12/2010 | Heim |
| 2010/0320742 | A1 | 12/2010 | Hoffmuller |
| 2011/0007374 | A1 | 1/2011 | Heim |
| 2011/0012337 | A1 | 1/2011 | Heim |
| 2011/0027538 | A1 | 2/2011 | Hoffmann |
| 2011/0045248 | A1 | 2/2011 | Hoffmuller |
| 2011/0069360 | A1 | 3/2011 | Dichtl |
| 2011/0079997 | A1 | 4/2011 | Heim |
| 2011/0091665 | A1 | 4/2011 | Heim |
| 2011/0095518 | A1 | 4/2011 | Hoffmuller |
| 2011/0101670 | A1 | 5/2011 | Heim |
| 2011/0109078 | A1 | 5/2011 | Hoffmuller |
| 2011/0114733 | A1 | 5/2011 | Heim |
| 2011/0157183 | A1 | 6/2011 | Kaule |
| 2012/0126525 | A1 | 5/2012 | Dorfler |
| 2012/0168515 | A1 | 7/2012 | Schutzmann |
| 2012/0170124 | A1 | 7/2012 | Fuhse |

FOREIGN PATENT DOCUMENTS

| | | | |
|---|---|---|---|
| DE | 102004007379 | B3 | 9/2005 |
| DE | 102004031879 | A1 | 1/2006 |
| DE | 102004059798 | A1 | 6/2006 |
| DE | 102005028162 | A1 | 12/2006 |
| DE | 102005052562 | A1 | 5/2007 |
| DE | 102005062132 | A1 | 7/2007 |
| DE | 102006006501 | A1 | 8/2007 |
| DE | 102006029536 | A1 | 12/2007 |
| DE | 102006029850 | A1 | 1/2008 |
| DE | 102007029203 | A1 | 1/2009 |
| DE | 102007062089 | A1 | 7/2009 |
| EP | 0064067 | A1 | 11/1982 |
| EP | 0238043 | A2 | 9/1987 |
| EP | 0330733 | A1 | 9/1989 |
| EP | 1554700 | B1 | 1/2007 |
| EP | 1953002 | A2 | 1/2008 |
| GB | 2362493 | A | 11/2001 |
| JP | 10035083 | A | 2/1998 |
| JP | 2001 055000 | A | 2/2001 |
| JP | 2003 039583 | A | 3/2003 |
| JP | 2003 120500 | A | 4/2003 |
| WO | WO 94/27254 | A1 | 11/1994 |
| WO | WO 99/13157 | A1 | 3/1999 |
| WO | WO 03/005075 | A1 | 1/2003 |
| WO | WO 2005/052650 | A2 | 6/2005 |
| WO | WO 2005/106601 | A2 | 11/2005 |
| WO | WO 2005105473 | | 11/2005 |
| WO | WO 2005105474 | | 11/2005 |
| WO | WO 2005105475 | | 11/2005 |
| WO | WO 2005108106 | | 11/2005 |
| WO | WO 2005108108 | | 11/2005 |
| WO | WO 2005108110 | | 11/2005 |
| WO | WO 2006005434 | | 1/2006 |
| WO | WO 2006015733 | | 2/2006 |
| WO | WO 2006018171 | | 2/2006 |
| WO | WO 2006018172 | | 2/2006 |
| WO | WO 2006/029745 | A1 | 3/2006 |
| WO | WO 2006040069 | | 4/2006 |
| WO | WO 2006056342 | | 6/2006 |
| WO | WO 2006072380 | | 7/2006 |
| WO | WO 2006/087138 | A1 | 8/2006 |
| WO | WO 2006087138 | | 8/2006 |
| WO | WO 2006099971 | | 9/2006 |
| WO | WO 2006119896 | | 11/2006 |
| WO | WO 2006128607 | | 12/2006 |
| WO | WO 2007/007793 | A1 | 1/2007 |
| WO | WO 2007006445 | | 1/2007 |
| WO | WO 2007006455 | | 1/2007 |
| WO | WO 2007/030530 | A2 | 3/2007 |
| WO | WO 2007/076952 | A2 | 7/2007 |
| WO | WO 2007076952 | | 7/2007 |
| WO | WO 2007079851 | | 7/2007 |
| WO | WO 2007/087984 | A1 | 8/2007 |
| WO | WO 2007115648 | | 10/2007 |
| WO | WO 2007/131765 | A2 | 11/2007 |
| WO | WO 2008/000350 | | 1/2008 |
| WO | WO 2008/000350 | A1 | 1/2008 |
| WO | WO 2008/000351 | | 1/2008 |
| WO | WO 2008/000351 | A2 | 1/2008 |
| WO | WO 2008/049533 | | 5/2008 |
| WO | WO 2008/061636 | | 5/2008 |
| WO | WO 2008/071325 | | 6/2008 |
| WO | WO 2009/000527 | | 12/2008 |
| WO | WO 2009/000528 | | 12/2008 |
| WO | WO 2009/000528 | A1 | 12/2008 |
| WO | WO 2009/000529 | | 12/2008 |
| WO | WO 2009/000529 | A2 | 12/2008 |
| WO | WO 2009/000530 | | 12/2008 |
| WO | WO 2009/012893 | | 1/2009 |
| WO | WO 2009/024265 | | 2/2009 |
| WO | WO 2009/080262 | | 7/2009 |
| WO | WO 2009/080263 | | 7/2009 |
| WO | WO 2009/083146 | | 7/2009 |
| WO | WO 2009/083151 | | 7/2009 |
| WO | WO 2009/100831 | | 8/2009 |
| WO | WO 2009/100869 | | 8/2009 |
| WO | WO 2009/109291 | | 9/2009 |
| WO | WO 2009/121578 | | 10/2009 |
| WO | WO 2009/149831 | | 12/2009 |
| WO | WO 2009/149833 | | 12/2009 |
| WO | WO 2009/156079 | | 12/2009 |

| | | |
|---|---|---|
| WO | WO 2010/000470 | 1/2010 |
| WO | WO 2010/003646 | 1/2010 |
| WO | WO 2010/028739 | 3/2010 |
| WO | WO 2011/012281 | 2/2011 |
| WO | WO 2011/032665 | 3/2011 |
| WO | WO 2011/032671 | 3/2011 |

OTHER PUBLICATIONS

German Search Report, German Patent Application No. DE 102007029204, Aug. 21, 2007, 4 pages.
German Search Report, German Patent Application No. DE 102007029203, Aug. 23, 2007, 4 pages.
Hutley M.C. et al., The moiré magnifier, Pure Appl. Opt. 3:133-142, 1994.
Kamal H. et al., Properties of moiré magnifiers, Optical Engineering 37(11):3007-3014, Nov. 1998.
Lippmann M. G., Epreuves reversibles—Photographies integrales, Comptes Rendues Acad. Sci. Paris 146:446-451, 1908 (in French).
International Search Report, International Application No. PCT/EP2008/005173, Dec. 15, 2008, 3 pages.
International Preliminary Report on Patentability, International Application No. PCT/EP2008/005173, Corrected Version, English Translation, Mar. 22, 2010, 6 pages.
International Search Report, International Application No. PCT/EP2008/005172, Nov. 21, 2008, 2 pages.
International Preliminary Report on Patentability, International Application No. PCT/EP2008/005172, English Translation, Apr. 1, 2010, 5 pages.
International Search Report, International Application No. PCT/EP2008/005174, Feb. 16, 2009, 3 pages.
International Preliminary Report on Patentability, International Application No. PCT/EP2008/005174, English Translation, Mar. 1, 2010, 7 pages.
International Search Report, International Application No. PCT/EP2008/005171, Nov. 21, 2008, 2 pages.
International Preliminary Report on Patentability, International Application No. PCT/EP2008/005171, English Translation, Mar. 29, 2010, 4 pages.
International Search Report, International Application No. PCT/EP2009/004326, Oct. 19, 2009, 3 pages.
International Preliminary Report on Patentability, International Application No. PCT/EP2009/004326, English Translation, Mar. 22, 2011, 5 pages.
International Search Report, International Application No. PCT/EP2009/005987, Jan. 27, 2010, 3 pages.
International Preliminary Report on Patentability, International Application No. PCT/EP2009/005987, English Translation, May 4, 2011, 5 pages.
Rahm, Michael, Modulo mapping—Novel Method to Arrange Microstructures for Moiré Magnifier Type Security Features, Abstract, Session 5: Optically Variable Security I, Jan. 22, 2010, Optical Document Security II, The 2010 Conference on Optical Security and Counterfeit Deterrence, Jan. 20-22, 2010, San Francisco, p. 1-5.
Rauscher W. et al., Novel method to arrange microstructures for moiré magnifier type security features, Optical Document Security II, San Francisco, Jan. 20-22, 2010, pp. 1-11.

* cited by examiner

80

SECURITY ELEMENT

CROSS-REFERENCE TO RELATED APPLICATIONS

This application is the U.S. National Stage of International Application No. PCT/EP2008/005174, filed Jun. 25, 2008, which claims the benefit of German Patent Application DE 10 2007 029 204.1, filed Jun. 25, 2007; both of which are hereby incorporated by reference to the extent not inconsistent with the disclosure herewith.

The present invention relates to a security element for security papers, value documents and the like having a microoptical moiré magnification arrangement for depicting a three-dimensional moiré image.

For protection, data carriers, such as value or identification documents, but also other valuable articles, such as branded articles, are often provided with security elements that permit the authenticity of the data carrier to be verified, and that simultaneously serve as protection against unauthorized reproduction. The security elements can be developed, for example, in the form of a security thread embedded in a banknote, a cover foil for a banknote having a hole, an applied security strip or a self-supporting transfer element that, after its manufacture, is applied to a value document.

Here, security elements having optically variable elements that, at different viewing angles, convey to the viewer a different image impression play a special role, since these cannot be reproduced even with top-quality color copiers. For this, the security elements can be furnished with security features in the form of diffraction-optically effective micro- or nanopatterns, such as with conventional embossed holograms or other hologram-like diffraction patterns, as are described, for example, in publications EP 0 330 733 A1 and EP 0 064 067 A1.

It is also known to use lens systems as security features. For example, in publication EP 0 238 043 A2 is described a security thread composed of a transparent material on whose surface a grating composed of multiple parallel cylindrical lenses is embossed. Here, the thickness of the security thread is chosen such that it corresponds approximately to the focal length of the cylindrical lenses. On the opposing surface, a printed image is applied in perfect register, the printed image being designed taking into account the optical properties of the cylindrical lenses. Due to the focusing effect of the cylindrical lenses and the position of the printed image in the focal plane, depending on the viewing angle, different sub-areas of the printed image are visible. In this way, through appropriate design of the printed image, pieces of information can be introduced that are, however, visible only from certain viewing angles. Through the appropriate development of the printed image, also "moving" pictures can be produced. However, when the document is turned about an axis that runs parallel to the cylindrical lenses, the motif moves only approximately continuously from one location on the security thread to another location.

From publication U.S. Pat. No. 5,712,731 A is known the use of a moiré magnification arrangement as a security feature. The security device described there exhibits a regular arrangement of substantially identical printed microimages having a size up to 250 μm, and a regular two-dimensional arrangement of substantially identical spherical microlenses. Here, the microlens arrangement exhibits substantially the same division as the microimage arrangement. If the microimage arrangement is viewed through the microlens arrangement, then one or more magnified versions of the microimages are produced for the viewer in the regions in which the two arrangements are substantially in register.

The fundamental operating principle of such moiré magnification arrangements is described in the article "The moiré magnifier," M. C. Hutley, R. Hunt, R. F. Stevens and P. Savander, Pure Appl. Opt. 3 (1994), pp. 133-142. In short, according to this article, moirémagnification refers to a phenomenon that occurs when a grid comprised of identical image objects is viewed through a lens grid having approximately the same grid dimension. As with every pair of similar grids, a moiré pattern results that, in this case, appears as a magnified and, if applicable, rotated image of the repeated elements of the image grid.

Based on that, it is the object of the present invention to avoid the disadvantages of the background art and especially to specify a security element having a microoptical moiré-magnification arrangement for depicting three-dimensional moiré images having impressive optical effects. To the greatest extent possible, it should be possible to view the three-dimensional moiré images without any field of view limitation, and to model them in all design variants with the aid of a computer.

This object is solved by the security element having the features of the main claim. A method for manufacturing such a security element, a security paper and a data carrier having such a security element are specified in the coordinated claims. Developments of the present invention are the subject of the dependent claims.

According to the present invention, a generic security element includes a microoptical moiré magnification arrangement for depicting a three-dimensional moiré image that includes, in at least two moiré image planes spaced apart in a direction normal to the moiré magnification arrangement, image components to be depicted, having

- a motif image that includes two or more periodic or at least locally periodic lattice cell arrangements having different lattice periods and/or different lattice orientations that are each allocated to one moiré image plane and that include micromotif image components for depicting the image component of the allocated moiré image plane,
- for the moiré-magnified viewing of the motif image, a focusing element grid that is arranged spaced apart from the motif image and that includes a periodic or at least locally periodic arrangement of a plurality of lattice cells having one microfocusing element each, wherein, for almost all tilt directions, upon tilting the security element, the magnified, three-dimensional moiré image moves in a moiré movement direction that differs from the tilt direction.

As explained in greater detail in the following, in such designs, the visual spatial impression and the sense of space resulting from the tilt movement are not consistent with one another, or even contradict one another, such that striking, in some cases almost dizzying effects with high attention and recognition value result for the viewer.

Here, the image components of the three-dimensional moiré image that are to be depicted can be formed by individual image points, a group of image points, lines or areal sections. As explained in greater detail below, it is normally advantageous especially in more complex moiré images to start from individual image points of the three-dimensional moiré image as the image components to be depicted, and for each of these moiré image points, to determine an associated micromotif image point and a lattice cell arrangement for the repeated arrangement of the micromotif image point in the motif plane. However, in simpler moiré images in which easily describable lines or even areal sections lie in a moiré image plane, such as the exemplary embodiments 1 to 4 described below, also these lines or areal sections can be chosen as the image components to be depicted, and the determination of the associated micromotif image components and their repeated arrangement in the motif plane carried out for the line or the areal section as a whole.

Here, the phrase that, for almost all tilt directions, upon tilting the security element, the moiré image moves in a moiré movement direction that differs from the tilt direction accounts for the fact that there can be certain special directions in which the tilt direction and the moiré movement direction coincide. For reasons of symmetry, there are normally exactly two such directions: if, namely, the moiré movement direction $\vec{v}$ and the tilt direction $\vec{k}$ are linked to one another in the plane of the moiré magnification arrangement via a symmetrical transformation matrix $\vec{M}$, $\vec{v}=\vec{M}\cdot\vec{k}$, then the relationships $\vec{v}_1=m_1\cdot\vec{k}_1$ and $\vec{v}_2=m_2\cdot\vec{k}_2$, with the eigenvalues of the transformation matrix $m_1$ and $m_2$, hold for both of the eigenvectors of the transformation matrix $\vec{k}_1,\vec{k}_2$ that exist in this case. For a tilting in the direction of one of the two eigenvectors, the movement direction and tilt direction are thus parallel, while they differ for all other tilt directions.

Due to the parallax upon tilting the security element, for the viewer, the three-dimensional moiré image particularly advantageously appears floating at a first height or depth above or below the plane of the security element, and due to the eye separation in binocular vision, appears at a second height or depth above or below the plane of the security element, the first and second height or depth differing for almost all viewing directions.

Here, the indication of a viewing direction comprises, in addition to the direction of view, also the direction of the eye separation of the viewer. Here, too, the phrase that the first and second height or depth differ for almost all viewing directions expresses the fact that there can be certain special viewing directions in which the first and second height or depth match. In particular, these special viewing directions can be exactly the directions in which the tilt direction and the moiré movement direction coincide.

In an advantageous variant of the present invention, both the lattice cell arrangements of the motif image and the lattice cells of the focusing element grid are arranged periodically. Here, the periodicity length is especially between 3 μm and 50 μm, preferably between 5 μm and 30 μm, particularly preferably between about 10 μm and about 20 μm.

According to another variant of the present invention, locally, both the lattice cell arrangements of the motif image and the lattice cells of the focusing element grid are arranged periodically, the local period parameters changing only slowly in relation to the periodicity length. For example, the local period parameters can be periodically modulated across the expanse of the security element, the modulation period being especially at least 20 times, preferably at least 50 times, particularly preferably at least 100 times greater than the local periodicity length. In this variant, too, the local periodicity length is especially between 3 μm and 50 μm, preferably between 5 μm and 30 μm, particularly preferably between about 10 μm and about 20 μm.

The lattice cell arrangements of the motif image and the lattice cells of the focusing element grid advantageously each form, at least locally, a two-dimensional Bravais lattice, preferably a Bravais lattice having low symmetry, such as a parallelogram lattice. The use of Bravais lattices having low symmetry offers the advantage that moirémagnification arrangements having such Bravais lattices are very difficult to imitate since, for the creation of a correct image upon viewing, the very difficult-to-analyze low symmetry of the arrangement must be reproduced exactly. Furthermore, the low symmetry creates great freedom for differently chosen lattice parameters that can thus be used as a hidden identifier for protected products according to the present invention without this being, for a viewer, easily perceptible in the moiré-magnified image. On the other hand, all attractive effects that are realizable with higher-symmetry moiré magnification arrangements can also be realized with the preferred low-symmetry moiré magnification arrangements.

The microfocusing elements are preferably formed by non-cylindrical microlenses, especially by microlenses having a circular or polygonally delimited base area. In other embodiments, the microfocusing elements can also be formed by elongated cylindrical lenses whose dimension in the longitudinal direction measures more than 250 μm, preferably more than 300 μm, particularly preferably more than 500 μm and especially more than 1 mm. In further preferred designs, the microfocusing elements are formed by circular apertures, slit apertures, circular or slit apertures provided with reflectors, aspherical lenses, Fresnel lenses, GRIN (Gradient Refractive Index) lenses, zone plates, holographic lenses, concave reflectors, Fresnel reflectors, zone reflectors or other elements having a focusing or also masking effect.

The total thickness of the security element is advantageously below 50 μm, preferably below 30 μm. The moiré image to be depicted preferably includes a three-dimensional depiction of an alphanumeric character string or of a logo. According to the present invention, the micromotif image components can especially be present in a printing layer.

In a second aspect, the present invention includes a generic security element having a microoptical moiré magnification arrangement for depicting a three-dimensional moiréimage that includes, in at least two moiré image planes spaced apart in a direction normal to the moiré magnification arrangement, image components to be depicted, having

- a motif image that includes, arranged at different heights, two or more periodic or at least locally periodic lattice cell arrangements that are each allocated to one moiré image plane and that include micromotif image components for depicting the image component of the allocated moiré image plane,
- for the moiré-magnified viewing of the motif image, a focusing element grid that is arranged spaced apart from the motif image and that includes a periodic or at least locally periodic arrangement of a plurality of lattice cells having one microfocusing element each, wherein, for almost all tilt directions, upon tilting the security element, the magnified, three-dimensional moiré image moves in a moiré movement direction that differs from the tilt direction.

In this aspect of the present invention, the lattice cell arrangements of the motif image preferably exhibit identical lattice periods and identical lattice orientations such that different moiré magnifications are created only by the different heights of the micromotif image components, and thus a different spacing of the micromotif image components and of the focusing element grid. For this, the micromotif image components lie particularly advantageously in an embossing layer at different embossing heights.

In both aspects, the security element according to the present invention advantageously exhibits an opaque cover layer to cover the moiré magnification arrangement in some regions. Thus, within the covered region, no moiré magnification effect occurs, such that the optically variable effect can be combined with conventional pieces of information or with other effects. This cover layer is advantageously present in the form of patterns, characters or codes and/or exhibits gaps in the form of patterns, characters or codes.

In all cited variants of the present invention, the motif image and the focusing element grid are preferably arranged at opposing surfaces of an optical spacing layer. The spacing layer can comprise, for example, a plastic foil and/or a lacquer layer.

Furthermore, the arrangement of microfocusing elements can be provided with a protective layer whose refractive index preferably differs from the refractive index of the microfocusing elements by at least 0.3, in the event that refractive lenses serve as microfocusing elements. In this case, due to the protective layer, the focal length of the lenses changes, which must be taken into account when dimensioning the radii of curvature of the lenses and/or the thickness of the spacing layer. In addition to the protection against environmental effects, such a protective layer also prevents the microfocusing element arrangement from being easily cast for counterfeiting purposes.

In both aspects of the present invention, the security element itself preferably constitutes a security thread, a tear strip, a security band, a security strip, a patch or a label for application to a security paper, value document or the like. In an advantageous embodiment, the security element can span a transparent or uncovered region of a data carrier. Here, different appearances can be realized on different sides of the data carrier.

The present invention also includes a method for manufacturing a security element having a microoptical moiré magnification arrangement for depicting a three-dimensional moiré image that includes, in at least two moiré image planes spaced apart in a direction normal to the moiré magnification arrangement, image components to be depicted, in which

- in a motif plane, a motif image is produced that includes two or more periodic or at least locally periodic lattice cell arrangements having different lattice periods and/or different lattice orientations that are each allocated to one moiré image plane and that are provided with micromotif image components for depicting the image component of the allocated moiré image plane,
- a focusing element grid for the moiré-magnified viewing of the motif image, having a periodic or at least locally periodic arrangement of a plurality of lattice cells having one microfocusing element each, is produced and arranged spaced apart from the motif image, the lattice cell arrangements of the motif plane, the micromotif image components and the focusing element grid being coordinated such that, for almost all tilt directions, upon tilting the security element, the magnified, three-dimensional moiré image moves in a moiré movement direction that differs from the tilt direction.

Here, the image components of the three-dimensional moiré image that are to be depicted can be formed by individual image points, a group of image points, lines or areal sections, wherein, especially in more complex moiré images, the use of individual image points as the image components to be depicted is appropriate.

According to another inventive method for manufacturing a security element having a microoptical moiré magnification arrangement for depicting a three-dimensional moiréimage that includes, in at least two moiré image planes spaced apart in a direction normal to the moiré magnification arrangement, image components to be depicted, it is provided that

- a motif image is produced having, arranged at different heights, two or more motif planes that each include a periodic or at least locally periodic lattice cell arrangement that is allocated to one moiré image plane and that is provided with micromotif image components for depicting the image component of the allocated moiré image plane,
- a focusing element grid for the moiré-magnified viewing of the motif image, having a periodic or at least locally periodic arrangement of a plurality of lattice cells having one microfocusing element each, is produced and arranged spaced apart from the motif image, the lattice cell arrangements of the motif planes, the micromotif image components and the focusing element grid being coordinated such that, for almost all tilt directions, upon tilting the security element, the magnified, three-dimensional moiré image moves in a moiré movement direction that differs from the tilt direction.

More specifically, in a method for manufacturing a security element having a microoptical moiré magnification arrangement for depicting a three-dimensional moiré image that includes, in at least two moiré image planes spaced apart in a direction normal to the moiré magnification arrangement, image components to be depicted, it is provided that a) a desired three-dimensional moiré image that is visible when viewed is defined as the target motif, b) a periodic or at least locally periodic arrangement of microfocusing elements is defined as the focusing element grid, c) a desired magnification and a desired movement of the visible three-dimensional moiré image when the moiré magnification arrangement is tilted laterally and when tilted forward/backward is defined, d) for each image component to be depicted, the associated micromotif image component for depicting this image component of the three-dimensional moiréimage, as well as the associated lattice cell arrangement for the arrangement of the micromotif image components in the motif plane, are calculated from the spacing of the associated moiré image plane from the moiré magnification arrangement, the defined magnification and movement behavior, and the focusing element grid, and e) the micromotif image components calculated for each image component to be depicted are composed to form a motif image that is to be arranged in the motif plane according to the associated lattice cell arrangement.

In many, especially more complex moiré images, it is advantageous to start from individual image points of the three-dimensional moiré image as the image components to be depicted and, in step d), for each of these moiré image points, to determine an associated micromotif image point and a lattice cell arrangement for the repeated arrangement of the micromotif image point in the motif plane. For an individual moiréimage point, the spacing of the associated moiré image plane from the moirémagnification arrangement is given simply by the height of the moiré image point above the magnification arrangement. Even if multiple or even many moiré image points lie at the same height and thus in the same moiré image plane, for the calculation of the motif image, it is normally simpler and more favorable to carry out the determination according to step d) for each of these moiré image points separately, and then, in step e), to compose the motif image from the repeatedly arranged micromotif image points, than to first combine the moiré image points that lie in a moiré image plane and then carry out the determination according to step d) for the combined image point set.

Preferably, in step c), for a reference point of the three-dimensional moiré image, further, a tilt direction $\gamma$ is specified in which the parallax is to be viewed, as well as a desired magnification and movement behavior for this reference point and the specified tilt direction. The moiré magnification factors in step d) for the other points of the three-dimensional moiré image are then based on the specified magnification factor for the reference point and the specified tilt direction.

The desired magnification and movement behavior for the reference point is preferably specified in the form of the matrix elements of a transformation matrix $$A = \begin{pmatrix} a_{11} & a_{12} \\ a_{21} & a_{22} \end{pmatrix}$$

and the magnification factor for the reference point is calculated from the transformation matrix A and the tilt direction γ using the relationship $$v = \sqrt{v_x^2 + v_y^2} = \sqrt{(a_{11}\cos\gamma + a_{12}\sin\gamma)^2 + (a_{21}\cos\gamma + a_{22}\sin\gamma)^2}\,.$$

Advantageously, in step d), for further points ($X_i$, $Y_i$, $Z_i$) of the three-dimensional moiréimage, the magnification factors $v_i$ and the allocated point coordinates in the motif plane ($x_i$, $y_i$) are calculated using the relationship $$\begin{pmatrix} X_i \\ Y_i \\ Z_i \end{pmatrix} = \frac{v_i}{v} \cdot \begin{pmatrix} a_{11} & a_{12} & 0 \\ a_{21} & a_{22} & 0 \\ 0 & 0 & v \end{pmatrix} \cdot \begin{pmatrix} x_i \\ y_i \\ e \end{pmatrix}$$

or its inverse $$\frac{v_i}{v}\begin{pmatrix} x_i \\ y_i \\ e \end{pmatrix} = \frac{1}{(a_{11}a_{22} - a_{12}a_{21})} \cdot \begin{pmatrix} a_{22} & -a_{12} & 0 \\ -a_{21} & a_{11} & 0 \\ 0 & 0 & 1 \end{pmatrix} \cdot \begin{pmatrix} X_i \\ Y_i \\ Z_i \end{pmatrix}$$

where e denotes the effective distance of the focusing element grid from the motif plane.

In step b), the focusing element grid is expediently specified by a grid matrix W. Then, in step d), the points of the motif plane belonging to a magnification $v_i$ are advantageously combined in each case to form a micromotif image component, and for this micromotif image component, a motif grid $U_i$ for the periodic or at least locally periodic arrangement of this micromotif image component is calculated using the relationship $$\overleftrightarrow{U}_i = (\overleftrightarrow{I} - \overleftrightarrow{A}_i^{-1}) \cdot \overleftrightarrow{W}$$

the transformation matrices $A_i$ being given by $$A_i = \frac{v_i}{v}\begin{pmatrix} a_{11} & a_{12} \\ a_{21} & a_{22} \end{pmatrix}$$

and $\overleftrightarrow{A}_i^{-1}$ denoting the inverse matrices.

In a method variant, in step b), the focusing element grid is specified in the form of a two-dimensional Bravais lattice having the grid matrix $$\overleftrightarrow{W} = \begin{pmatrix} w_{11} & w_{12} \\ w_{21} & w_{22} \end{pmatrix}, W1i, W2i$$

representing the components of the lattice cell vectors $\vec{w}_i$, where i=1,2.

According to another method variant for manufacturing a cylindrical lens 3D moirémagnifier, in step b), a cylindrical lens grid is specified by the grid matrix $$W = \begin{pmatrix} \cos\phi & -\sin\phi \\ \sin\phi & \cos\phi \end{pmatrix} \cdot \begin{pmatrix} D & 0 \\ 0 & \infty \end{pmatrix} \text{ or}$$

$$W^{-1} = \begin{pmatrix} \frac{1}{D} & 0 \\ 0 & 0 \end{pmatrix} \cdot \begin{pmatrix} \cos\phi & \sin\phi \\ -\sin\phi & \cos\phi \end{pmatrix}$$

where D denotes the lens spacing and ϕ the orientation of the cylindrical lenses.

In all aspects of the present invention, the lattice parameters of the Bravais lattice can be location independent. However, it is likewise possible to modulate the lattice vectors of the motif grid lattice cells $\vec{u}_1$ and $\vec{u}_2$ (or $\vec{u}_1^{(i)}$ and $\vec{u}_2^{(i)}$ in the case of multiple motif grids $U_i$) and the lattice vectors of the focusing element grid $\vec{w}_1$ and $\vec{w}_2$ location dependently, the local period parameters $|\vec{u}_1|$, $|\vec{u}_2|\angle(\vec{u}_1, \vec{u}_2)$ and $|\vec{w}_1|$, $|\vec{w}_1|$, $|\vec{w}_2|$, $\angle(\vec{w}_1, \vec{w}_2)$ changing, according to the present invention, only slowly in relation to the periodicity length. In this way it is ensured that, locally, the arrangements can always be reasonably described by Bravais lattices.

A security paper for manufacturing security or value documents, such as banknotes, checks, identification cards or the like, is preferably furnished with a security element of the kind described above. The security paper can especially comprise a carrier substrate composed of paper or plastic.

The present invention also includes a data carrier, especially a branded article, a value document, a decorative article, such as packaging, postcards or the like, having a security element of the kind described above. Here, the security element can especially be arranged in a window region, that is, a transparent or uncovered region of the data carrier.

Further exemplary embodiments and advantages of the present invention are described below with reference to the drawings. To improve clarity, a depiction to scale and proportion was dispensed with in the drawings.

Figure 2:
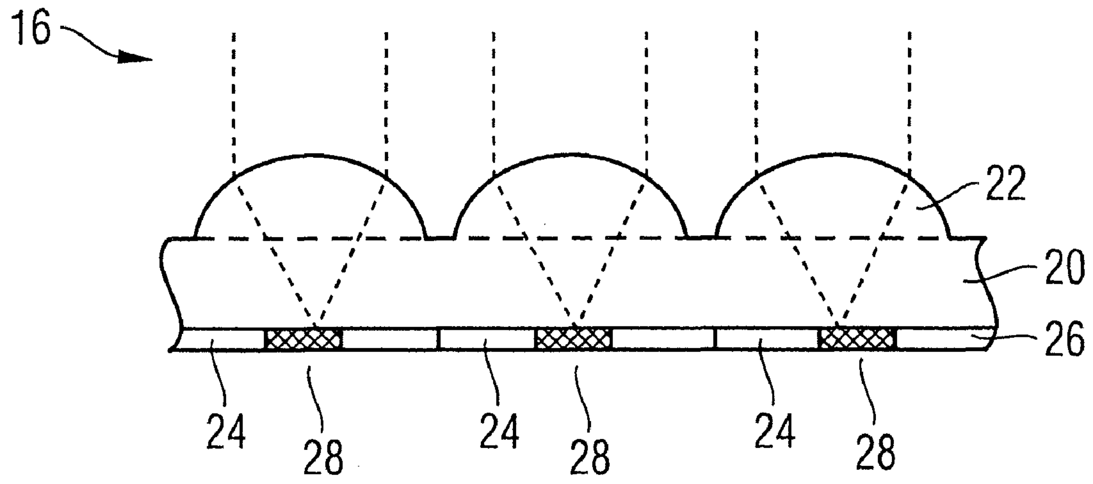
Figure 3:
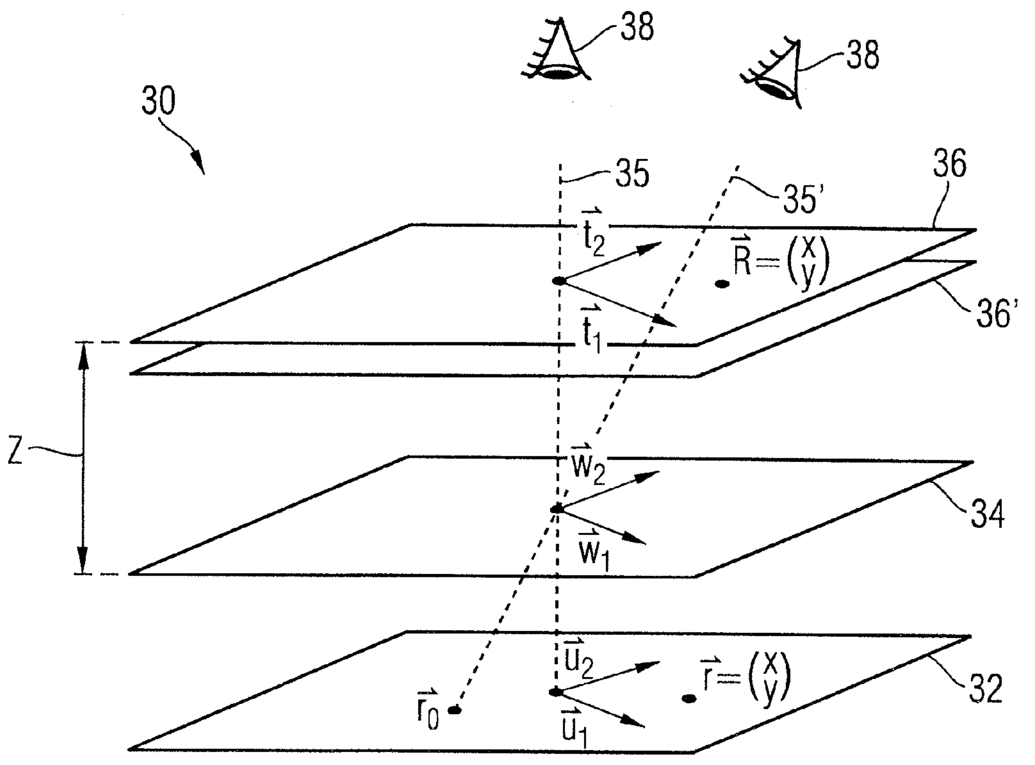
Figure 4:
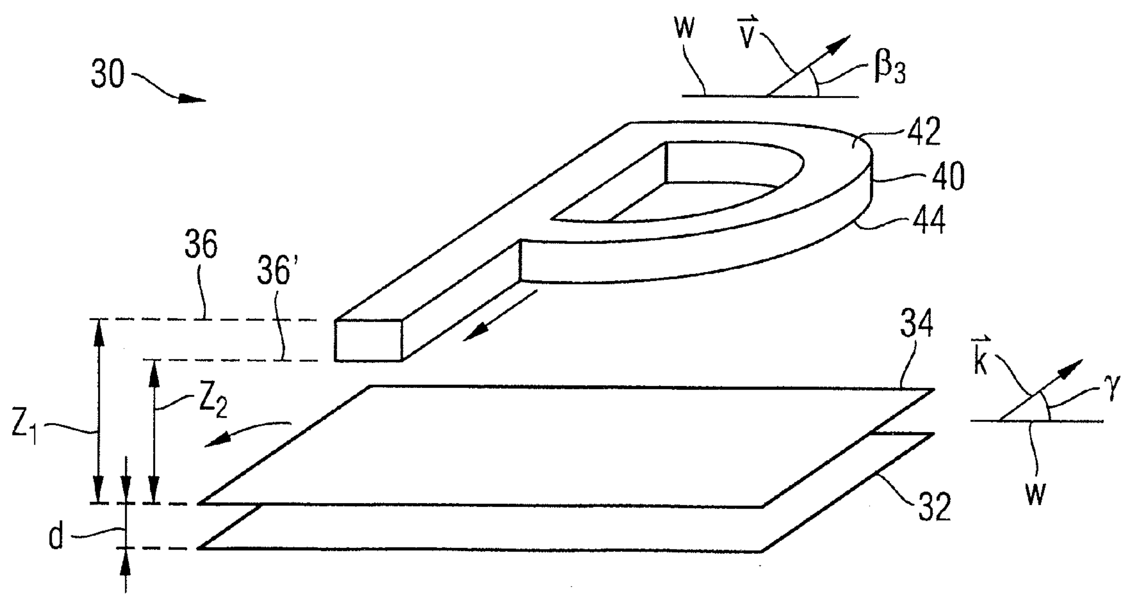
Figure 5:
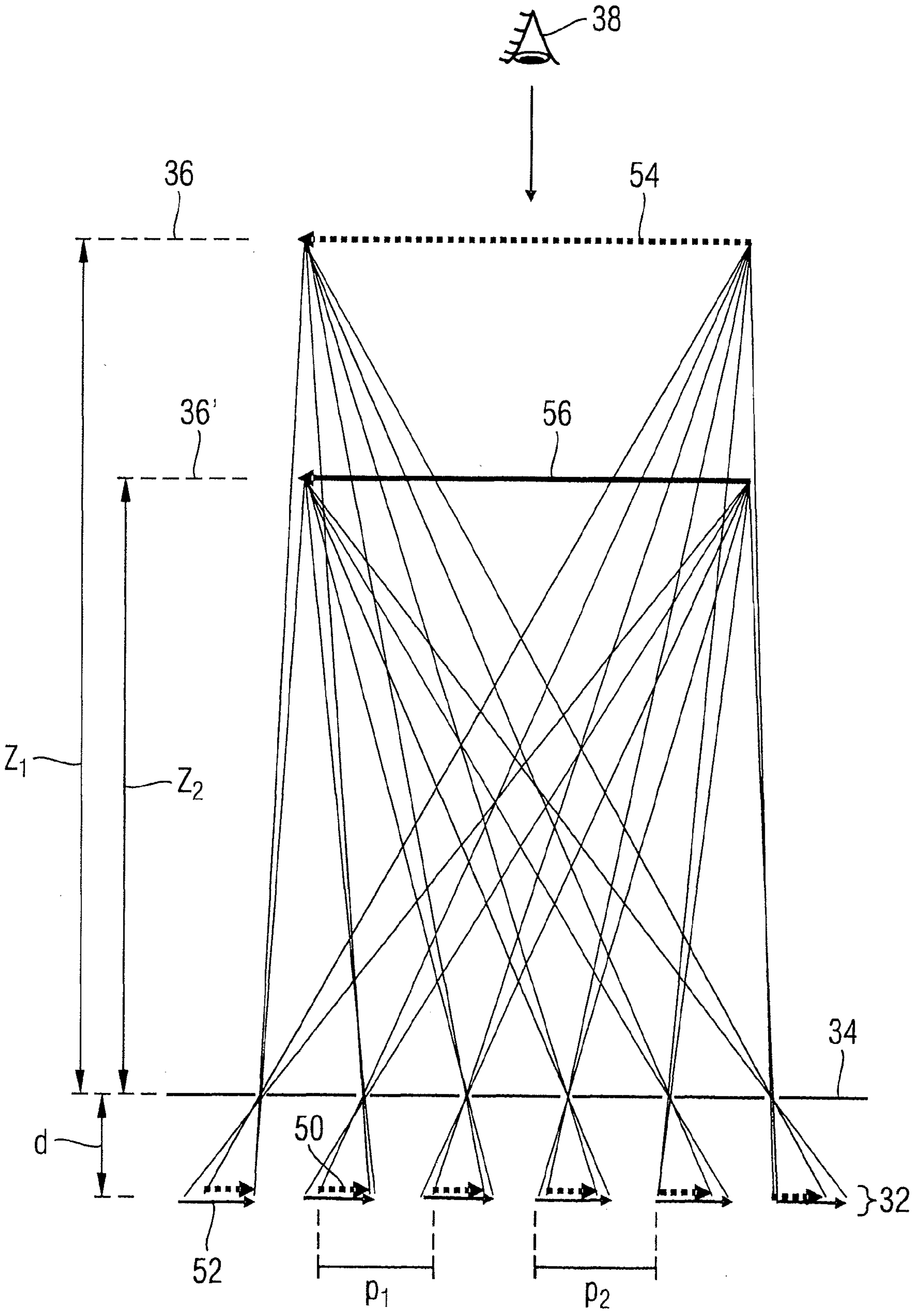
Figure 6A:
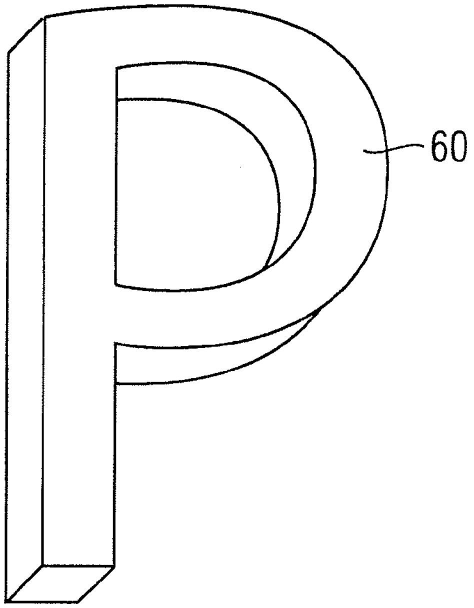
Figure 6B:
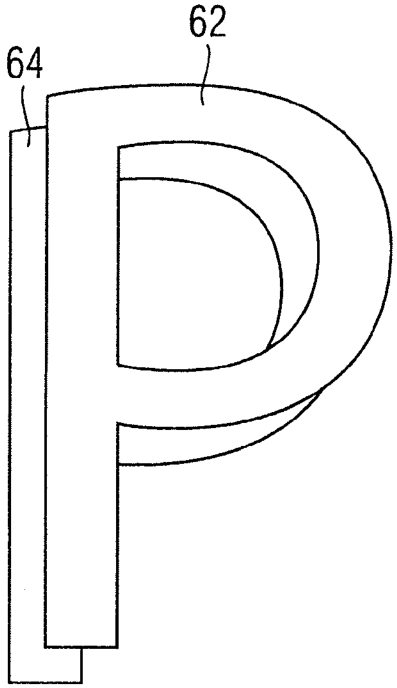
Figure 6C:
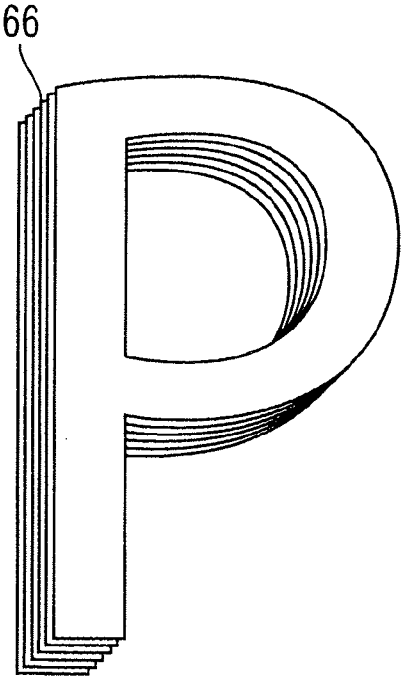
Figure 7A:
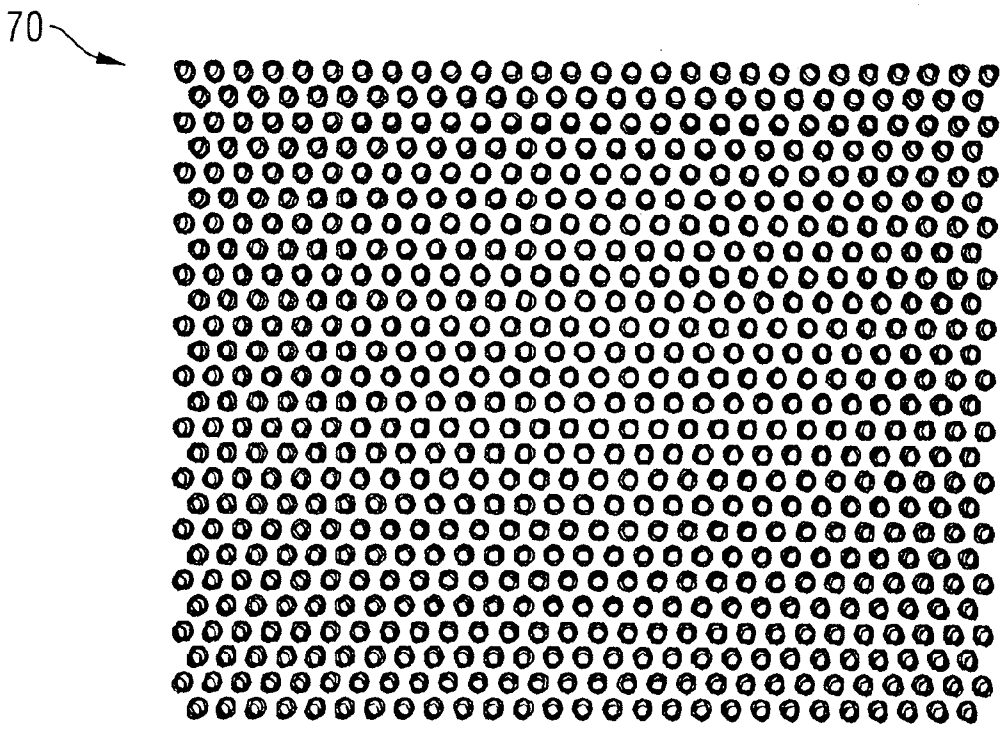
Figure 7B:
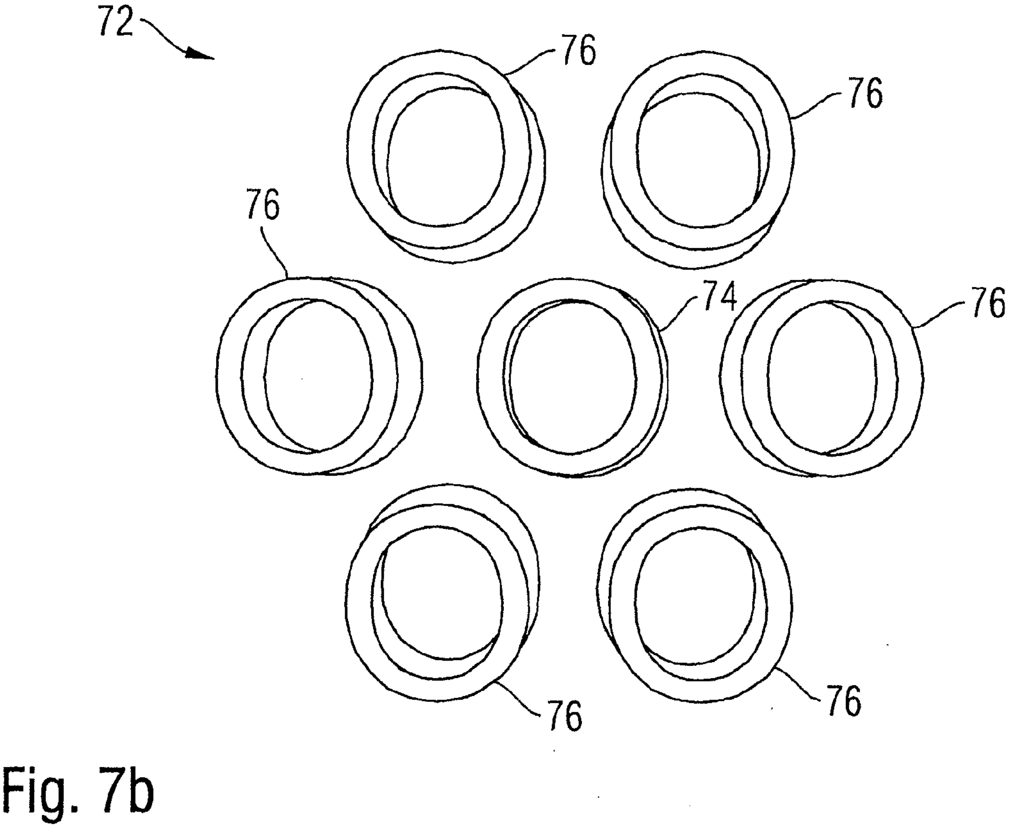
Figure 8A:
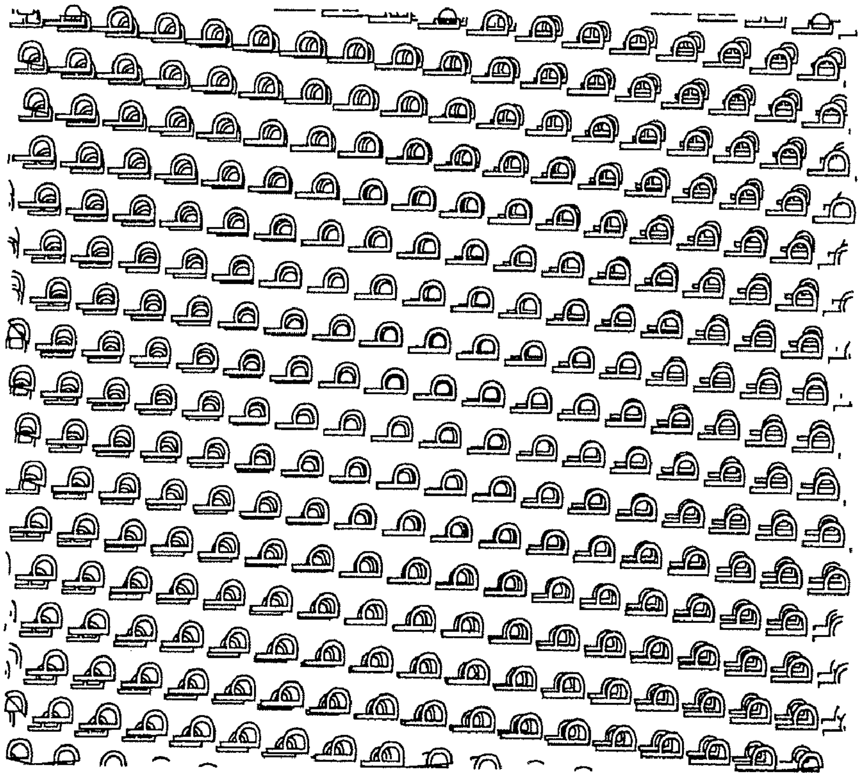
Figure 8B:
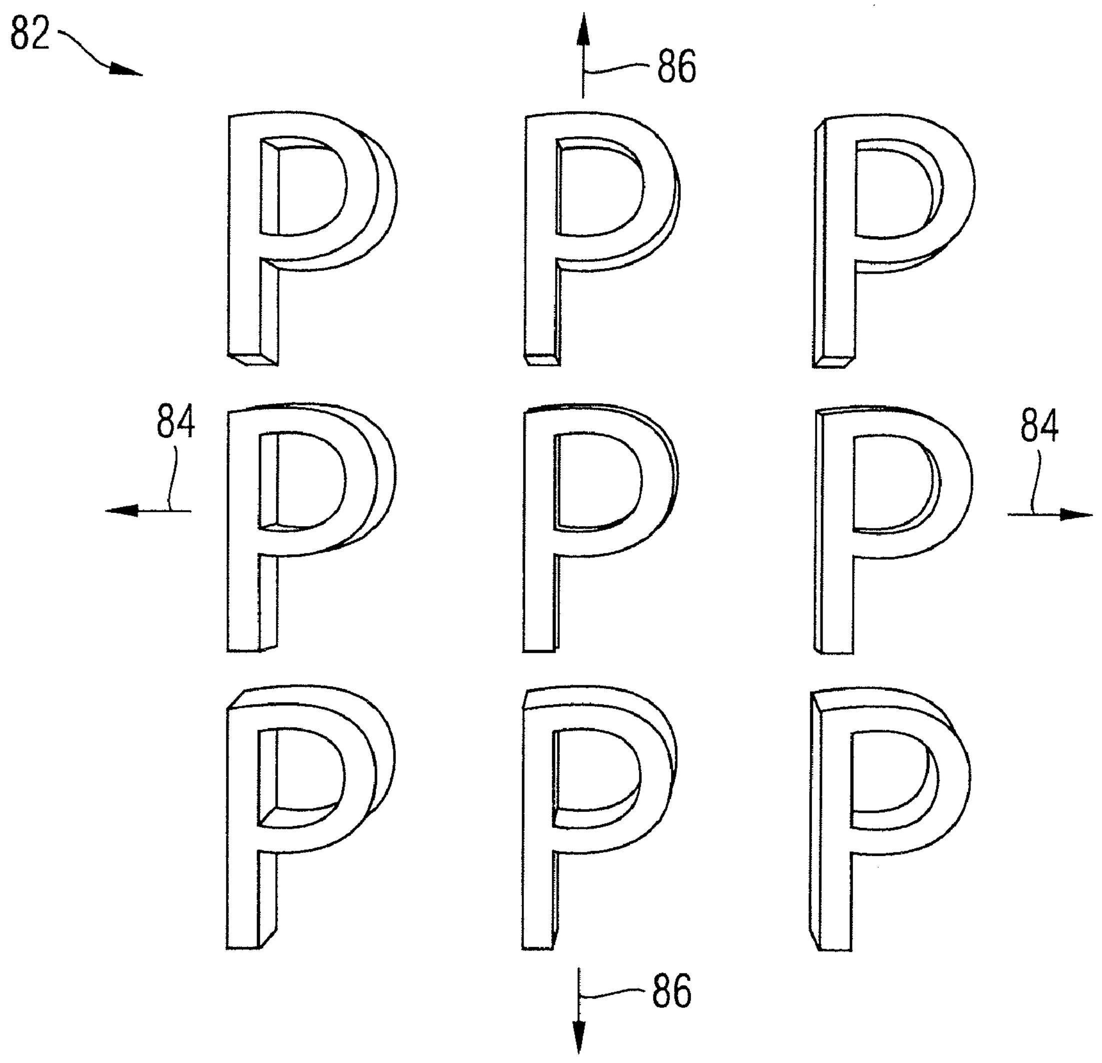
Figure 9A:
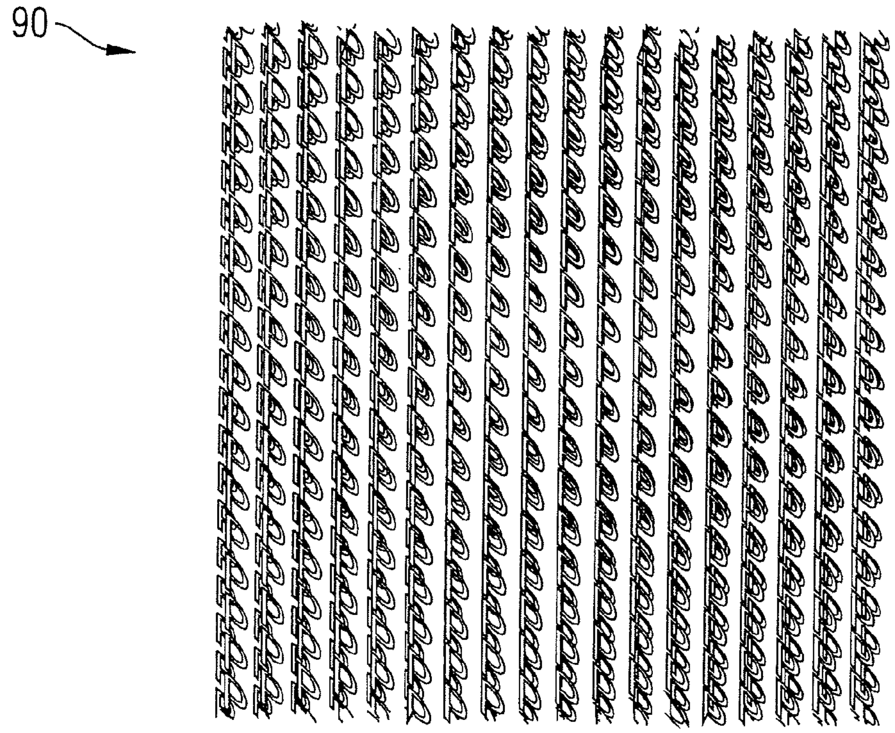
Figure 9B:
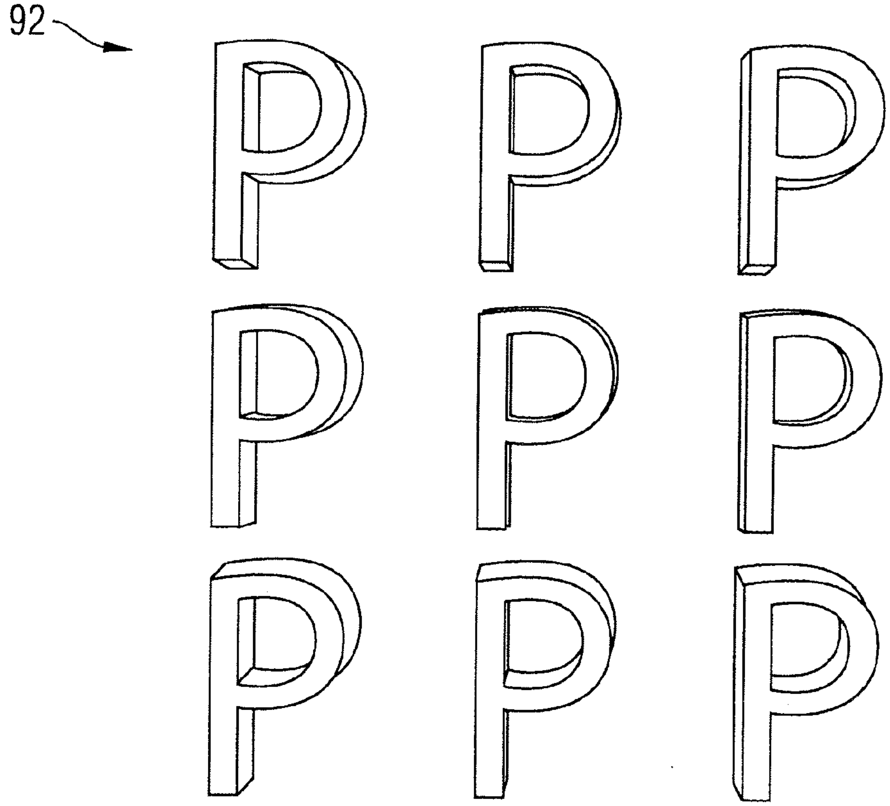
Figure 10:
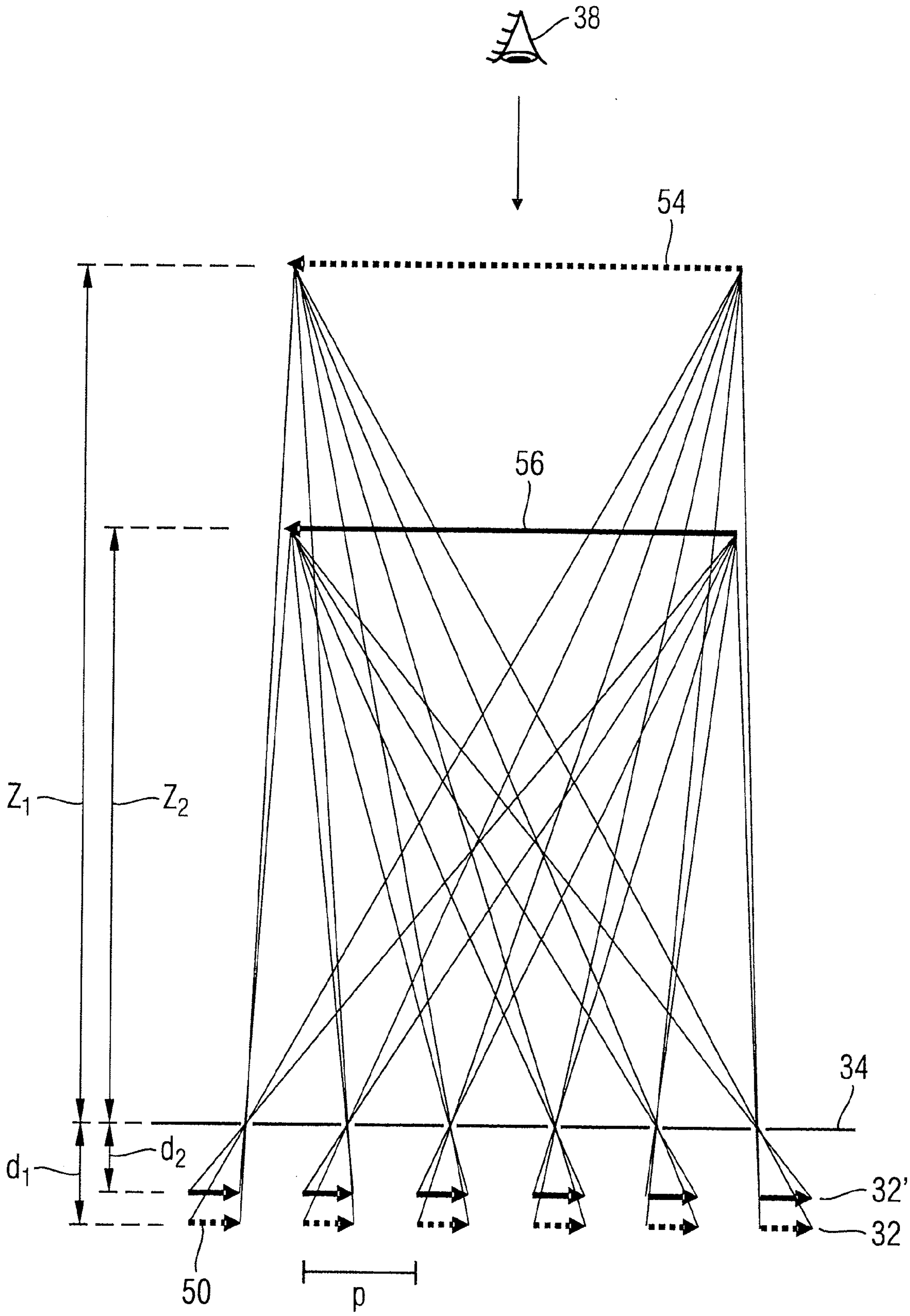

Shown are:

FIG. 1 a schematic diagram of a banknote having an embedded security thread and an affixed transfer element, FIG. 2 schematically, the layer structure of a security element according to the present invention, in cross section, FIG. 3 schematically, the relationships when viewing a moire magnification arrangement, to define the occurring variables, FIG. 4 further definitions of occurring variables in a moiré magnification arrangement for depicting a simple three-dimensional moiré image, FIG. 5 schematically, the relationships when a moiré magnification arrangement is viewed, to illustrate the realization of different magnifications in the case of different motif grids in the motif plane, FIG. 6 in (a), a simple three-dimensional motif in the form of a letter "P", in (b), a depiction of this motif by only two parallel image planes, in (c), by five parallel image planes, FIG. 7 in (a), a motif image constructed according to the present invention, and in (b), schematically, a section of the three-dimensional moiré image that results when the motif image from (a) is viewed with a suitable hexagonal lens grid, FIG. 8 in (a), a motif image constructed according to the present invention having orthoparallactic movement behavior, and in (b), schematically, a section of the three-dimensional moiré image that results when the motif image from (a) is viewed with a suitable rectangular lens grid, FIG. 9 in (a), a motif image constructed according to the present invention having diagonal movement behavior, and in (b), schematically, a section of the three-dimensional moiré image that results when the motif image from (a) is viewed with a suitable rectangular lens grid, and FIG. 10 schematically, the relationships when a moiré magnification arrangement is viewed, to illustrate the realization of different magnifications in the case of motif planes at different depths $d_1$, $d_2$.

The invention will now be explained using a security element for a banknote as an example. For this, FIG. 1 shows a schematic diagram of a banknote 10 that is provided with two security elements 12 and 16 according to exemplary embodiments of the present invention. The first security element constitutes a security thread 12 that emerges at certain window regions 14 at the surface of the banknote 10, while it is embedded in the interior of the banknote 10 in the regions lying therebetween. The second security element is formed by an affixed transfer element 16 of arbitrary shape. The security element 16 can also be developed in the form of a cover foil that is arranged over a window region or a through opening in the banknote. The security element can be designed for viewing in top view, looking through, or for viewing both in top view and looking through. Also two-sided designs can be used in which lens grids are arranged on both sides of a motif image.

Both the security thread 12 and the transfer element 16 can include a moirémagnification arrangement according to an exemplary embodiment of the present invention. The operating principle and the inventive manufacturing method for such arrangements are described in greater detail in the following based on the transfer element 16.

FIG. 2 shows schematically the layer structure of the transfer element 16, in cross section, with only the portions of the layer structure that are required to explain the functional principle being depicted. The transfer element 16 includes a substrate 20 in the form of a transparent plastic foil, in the exemplary embodiment a polyethylene terephthalate (PET) foil about 20 μm thick.

The top of the substrate foil 20 is provided with a grid-shaped arrangement of microlenses 22 that form, on the surface of the substrate foil, a two-dimensional Bravais lattice having a prechosen symmetry. The Bravais lattice can exhibit, for example, a hexagonal lattice symmetry, but due to the higher counterfeit security, lower symmetries, and thus more general shapes, are preferred, especially the symmetry of a parallelogram lattice.

The spacing of adjacent microlenses 22 is preferably chosen to be as small as possible in order to ensure as high an areal coverage as possible and thus a high-contrast depiction. The spherically or aspherically designed microlenses 22 preferably exhibit a diameter between 5 μm and 50 μm and especially a diameter between merely 10 μm and 35 μm and are thus not perceptible with the naked eye. It is understood that, in other designs, also larger or smaller dimensions may be used. For example, in the case of moirémagnifier patterns, the microlenses can exhibit, for decorative purposes, a diameter between 50 μm and 5 mm, while in moiré magnifier patterns that are to be decodable only with a magnifier or a microscope, also dimensions below 5 μm can be used.

On the bottom of the carrier foil 20 is arranged a motif layer 26 that includes two or more likewise grid-shaped lattice cell arrangements having different lattice periods and/or different lattice orientations. The lattice cell arrangements are each formed from a plurality of lattice cells 24, only one of these lattice cell arrangements being depicted in FIG. 2 for the sake of clarity. Designs having multiple lattice cell arrangements are shown, for example, in FIGS. 5, 7(*a*), 8(*a*) and 9(*a*).

As explained in greater detail below, the moiré magnification arrangement in FIG. 2 produces for the viewer a three-dimensional moiré image, in other words a moiré image that includes image components in at least two moiré image planes spaced apart in a direction normal to the moiré magnification arrangement. For this, each of the lattice cell arrangements of the motif layer 26 is allocated to one of the moiré image planes in each case, and the lattice cells 24 of this lattice cell arrangement include micromotif image components 28 for depicting the image component of exactly this allocated moiréimage plane.

In addition to the lens grid, also the motif lattices form two-dimensional Bravais lattices having a symmetry that is prechosen or that results from calculation, a parallelogram lattice again being assumed for illustration. As indicated in FIG. 2 through the offset of the lattice cells 24 with respect to the microlenses 22, the Bravais lattice of the lattice cells 24 differs slightly in its symmetry and/or in the size of its lattice parameters from the Bravais lattice of the microlenses 22 to produce the desired moiré magnification effect. Here, the lattice period and the diameter of the lattice cells 24 are on the same order of magnitude as those of the microlenses 22, so preferably in the range from 5 μm to 50 μm and especially in the range from 10 μm to 35 μm, such that also the micromotif image components 28 are not perceptible even with the naked eye. In designs having the above-mentioned larger or smaller microlenses, of course also the lattice cells 24 are developed to be a larger or smaller, accordingly.

The optical thickness of the substrate foil 20 and the focal length of the microlenses 22 are coordinated with each other such that the motif layer 26 is located approximately the lens focal length away. The substrate foil 20 thus forms an optical spacing layer that ensures a desired constant spacing of the microlenses 22 and of the motif layer having the micromotif image components 28.

Due to the slightly differing lattice parameters, the viewer sees, when viewing from above through the microlenses 22, a somewhat different sub-region of the micromotif image components 28 each time, such that the plurality of microlenses 22 produces, overall, a magnified image of the micromotifs. Here, the resulting moiré magnification depends on the relative difference between the lattice parameters of the Bravais lattices used. If, for example, the grating periods of two hexagonal lattices differ by 1%, then a 100× moiré magnification results. For a more detailed description of the operating principle and for advantageous arrangements of the motif grids and the microlens grids, reference is made to the German patent application 10 2005 062 132.5 and the international application PCT/EP2006/012374, the disclosures of which are incorporated herein by reference.

Now, the moiré magnification arrangements of the present application produce for the viewer not only planar objects floating in front of or behind the plane of the arrangement, but rather produce three-dimensional moiré images having a pattern that extends into the depth of space. These moiré magnification arrangements are thus also referred to below as 3D moiré magnifiers.

In particular, according to the present invention, three-dimensional moiré images are depicted that, upon tilting the moiré magnification arrangement, move in a direction that differs from the tilt direction. As explained in greater detail below, in such designs, the visual spatial impression and the sense of space resulting from the tilt movement are not consistent with one another, or even contradict one another, such that striking, in some cases almost dizzying effects with high attention and recognition value result for the viewer.

Furthermore, a mathematical approach is to be presented with which all variants of 3D moiré magnifiers can be described and, for manufacturing, modeled with the aid of a computer. Also, the three-dimensional moiré images produced by the 3D moirémagnifiers should be able to be viewed without field of view limitations.

Thus, to explain the approach according to the present invention, the required variables will first be defined and briefly described with reference to FIGS. 3 and 4. For a more precise description, reference is additionally made to the already cited German patent application 10 2005 062 132.5 and the international application PCT/EP2006/012374, the disclosures of which are incorporated herein by reference.

FIGS. 3 and 4 show schematically a moiré magnification arrangement 30, which is not depicted to scale, having a motif plane 32 in which the motif image having the micromotif image components is arranged and having a lens plane 34 in which the microlens grid is located. The moiré magnification arrangement 30 produces two or more moiré image planes 36, 36' (two are shown in FIG. 3) in which the magnified three-dimensional moiré image 40 (FIG. 4) perceived by the viewer 38 is described.

The arrangement of the micromotif image components in the motif plane 32 is described by two or more two-dimensional Bravais lattices whose unit cells can each be represented by vectors $\vec{u}_1$ and $\vec{u}_2$ (having the components $u_{11}$, $u_{21}$ and $u_{12}$, $u_{22}$). For the sake of clarity, in FIG. 3, one of these unit cells is singled out and depicted.

In compact notation, the unit cell of the motif grid can also be specified in matrix form by a motif grid matrix $\overleftrightarrow{U}$ (below also often simply called motif grid):

$$\overleftrightarrow{U} = (\vec{u}_1, \vec{u}_2) = \begin{pmatrix} u_{11} & u_{12} \\ u_{21} & u_{22} \end{pmatrix}$$

In the case of two or more motif grids in the motif plane, the associated motif grid matrices are differentiated in the following by their indices $U_1$, $U_2$, . . . .

Also the arrangement of microlenses in the lens plane 34 is described by a two-dimensional Bravais lattice whose unit cell is specified by the vectors $\vec{w}_1$ and $\vec{w}_2$ (having the components $w_{11}$, $w_{21}$ and $w_{12}$, $w_{22}$).

The unit cell in the moiré image planes 36, 36' is described with the vectors $\vec{t}_1$ and $\vec{t}_2$ (having the components $t_{11}$, $t_{21}$ and $t_{12}$, $t_{22}$). In addition to the two-dimensional position of the point in one of the image planes, in the case of the three-dimensional moiréimages, the specification in which moiré image plane an image point lies is also required for the complete description of a moiré image point. In the context of this description, this is done by specifying the Z-component of the moiré image point, in other words the perceived floating height of the image point above or below the plane of the moiré magnification arrangement, as illustrated in FIGS. 3 and 4.

In the following, $$\vec{r} = \begin{pmatrix} x \\ y \end{pmatrix}$$

designates a general point in the motif plane 32, and $$\vec{R}^{3D} = \begin{pmatrix} X \\ Y \\ Z \end{pmatrix}$$

a general moiré image point in one of the moiré image planes 36, 36'. Within each (two-dimensional) moiré image plane 36, the image points can be described by the two-dimensional coordinates $$\vec{R} = \begin{pmatrix} X \\ Y \end{pmatrix}.$$

To be able to describe, in addition to vertical viewing (viewing direction 35), also non-vertical viewing directions of the moiré magnification arrangement, such as the general direction 35', between the lens plane 34 and the motif plane 32 is additionally permitted a displacement that is specified by a displacement vector $$\vec{r}_0 = \begin{pmatrix} x_0 \\ y_0 \end{pmatrix}$$

in the motif plane 32. Analogously to the motif grid matrix, the matrices $$\overleftrightarrow{W} = \begin{pmatrix} w_{11} & w_{12} \\ w_{21} & w_{22} \end{pmatrix}$$

(referred to as the lens grid matrix or simply lens grid) and $$\overleftrightarrow{T} = \begin{pmatrix} t_{11} & t_{12} \\ t_{21} & t_{22} \end{pmatrix}$$

are used for the compact description of the lens grid and the image grid.

In the lens plane 34, in place of lenses 22, also, for example, circular apertures can be used, according to the principle of the pinhole camera. Also all other types of lenses and imaging systems, such as aspherical lenses, cylindrical lenses, slit apertures, circular or slit apertures provided with reflectors, Fresnel lenses, GRIN lenses (Gradient Refractive Index), zone plates (diffraction lenses), holographic lenses, concave reflectors, Fresnel reflectors, zone reflectors and other elements having a focusing or also a masking effect, can be used as microfocusing elements in the focusing element grid.

In principle, in addition to elements having a focusing effect, also elements having a masking effect (circular or slot apertures, also reflector surfaces behind circular or slot apertures) can be used as microfocusing elements in the focusing element grid.

When a concave reflector array is used, and with other reflecting focusing element grids used according to the present invention, the viewer looks through the in this case partially transmissive motif image at the reflector array lying therebehind and sees the individual small reflectors as light or dark points of which the image to be depicted is made up. Here, the motif image is generally so finely patterned that it can be seen only as a fog. The formulas described for the relationships between the image to be depicted and the moiré image apply also when this is not specifically mentioned, not only for lens grids, but also for reflector grids. It is understood that, when concave reflectors are used according to the present invention, the reflector focal length takes the place of the lens focal length.

If, in place of a lens array, a reflector array is used according to the present invention, the viewing direction in FIG. 2 is to be thought from below, and in FIG. 3, the planes 32 and 34 in the reflector array arrangement are interchanged. The further description of the present invention is based on lens grids, which stand representatively for all other focusing element grids used according to the present invention.

Precisely one of the moiré image planes 36, 36' is allocated to each motif grid $\vec{U}$, so to each of the different lattice cell arrangements of the motif plane 32. The moiré image lattice $\vec{T}$ of this allocated moiré image plane 36 results from the lattice vectors of the motif plane 32 and the lens plane 34 through $$\overleftrightarrow{T} = \overleftrightarrow{W}\cdot(\overleftrightarrow{W}-\overleftrightarrow{U})^{-1}\cdot\overleftrightarrow{U}$$

and the image points within the moiré image plane 36 can be determined with the aid of the relationship $$\vec{R} = \overleftrightarrow{W}\cdot(\overleftrightarrow{W}-\overleftrightarrow{U})^{-1}\cdot(\vec{r}-\vec{r}_0)$$

from the image points of the motif plane 32. Conversely, the lattice vectors of the motif plane 32 result from the lens grid and the desired moiré image lattice of a motif plane 36 through $$\overleftrightarrow{U} = \overleftrightarrow{W}\cdot(\overleftrightarrow{T}+\overleftrightarrow{W})^{-1}\cdot\overleftrightarrow{T}$$

and $$\vec{r} = \overleftrightarrow{W}\cdot(\overleftrightarrow{T}+\overleftrightarrow{W})^{-1}\cdot\vec{R}+\vec{r}_0.$$

If the transformation matrix $\overleftrightarrow{A} = \overleftrightarrow{W}\cdot(\overleftrightarrow{W}-\overleftrightarrow{U})^{-1}$ is defined that transitions the coordinates of the points in the motif plane 32 and the points in the moiré image plane 36, $$\vec{R} = \overleftrightarrow{A}\cdot(\vec{r}-\vec{r}_0)$$

and $$\vec{r} = \overleftrightarrow{A}^{-1}\cdot\vec{R}+\vec{r}_0,$$

then, from two of the four matrices $\overleftrightarrow{U}$, $\overleftrightarrow{W}$, $\overleftrightarrow{T}$, $\overleftrightarrow{A}$ in each case, the other two can be calculated. In particular:

$$\overleftrightarrow{T} = \overleftrightarrow{A}\cdot\overleftrightarrow{U} = \overleftrightarrow{W}\cdot(\overleftrightarrow{W}-\overleftrightarrow{U})^{-1}\cdot\overleftrightarrow{U} = (\overleftrightarrow{A}-\overleftrightarrow{I})\cdot\overleftrightarrow{W} \quad \text{(M1)}$$

$$\overleftrightarrow{U} = \overleftrightarrow{W}\cdot(\overleftrightarrow{T}+\overleftrightarrow{W})^{-1}\cdot\overleftrightarrow{T} = \overleftrightarrow{A}^{-1}\cdot\overleftrightarrow{T} = (\overleftrightarrow{I}-\overleftrightarrow{A}^{-1})\cdot\overleftrightarrow{W} \quad \text{(M2)}$$

$$\overleftrightarrow{W} = \overleftrightarrow{U}\cdot(\overleftrightarrow{T}-\overleftrightarrow{U})^{-1}\cdot\overleftrightarrow{T} = (\overleftrightarrow{A}-\overleftrightarrow{I})^{-1}\cdot\overleftrightarrow{T} = (\overleftrightarrow{A}-\overleftrightarrow{I})^{-1}\cdot\overleftrightarrow{A}\cdot\overleftrightarrow{U} \quad \text{(M3)}$$

$$\overleftrightarrow{A} = \overleftrightarrow{W}\cdot(\overleftrightarrow{W}-\overleftrightarrow{U})^{-1} = (\overleftrightarrow{T}+\overleftrightarrow{W})\cdot\overleftrightarrow{W}^{-1} = \overleftrightarrow{T}\cdot\overleftrightarrow{U}^{-1} \quad \text{(M4)}$$

applies, $\overleftrightarrow{I}$ designating the identity matrix.

As described in detail in the referenced German patent application 10 2005 062 132.5 and the international application PCT/EP2006/012374, the transformation matrix $\overleftrightarrow{A}$ describes both the moiré magnification and the resulting movement of the magnified moiré image upon movement of the moiré-forming arrangement 30, which derives from the displacement of the motif plane 32 against the lens plane 34.

The grid matrices T, U, W, the identity matrix I and the transformation matrix A are often also written below without a double arrow if it is clear from the context that matrices are being referred to.

As mentioned, in addition to these two-dimensional relationships, the three-dimensional expanse of the depicted moiré image 40 is accounted for by the specification of an additional coordinate that indicates the spacing in which a moiréimage point appears to float above or below the plane of the moiré magnification arrangement. If v denotes the moiré magnification and e an effective distance of the lens plane 34 from the motif plane 32 in which, in addition to the physical spacing d, also the lens data and the refractive index of the medium between the lens grid and the motif grid are usually taken into account heuristically, then the Z-component of a moiréimage point is given by $$Z=v^*e. \quad (1)$$

Now, according to equation (1), a three-dimensional moiré image 40, in other words an image having different Z-values, can be produced in two different ways. On the one hand, the moiré magnification v can be left constant and different values of e realized in the moiré magnifier, or with a uniform effective distance e, different moirémagnifications can be produced through different motif grids. The first-mentioned approach is described in greater detail below in connection with FIG. 10, and the last-mentioned is based on the following description of FIGS. 3 to 9.

FIG. 4 shows a depiction of a simple three-dimensional moiré image 40 and its breakdown into image components 42, 44 in only two spaced-apart moiré image planes 36, 36' that is sufficient to be able to explain the essential design features of the present invention. In particular, for the image components in the image plane 36 (top 42 of the letter "P") a moiré magnification $v_1$ is realized by a suitably chosen motif grid $U_1$, and for the image components in the image plane 36' (bottom 44 of the letter "P") a moirémagnification $v_2$ is realized by a suitably chosen motif grid $U_2$ such that, if the effective distance e is constant, two image planes 36, 36' having different Z-values $$Z_1=v_1^*e, Z_2=v_2^*e,$$

result.

To explain the principle effect, first, the special case of transformation matrices A is considered, which describe a pure magnification, in other words no rotation or distortion, $$A_i = v_i \cdot I = v_i\begin{pmatrix} 1 & 0 \\ 0 & 1 \end{pmatrix}, \text{ where } i = 1, 2.$$

If the lens grid W is specified, then, for the motif grids $U_1$ and $U_2$ is obtained therewith, with the aid of relationship (M2):

$$U_1 = \begin{pmatrix} u_{11}^{(1)} & u_{12}^{(1)} \\ u_{21}^{(1)} & u_{22}^{(1)} \end{pmatrix} = \left(1 - \frac{1}{v_1}\right) \cdot \begin{pmatrix} w_{11} & w_{12} \\ w_{21} & w_{22} \end{pmatrix}$$

and $$U_2 = \begin{pmatrix} u_{11}^{(2)} & u_{12}^{(2)} \\ u_{21}^{(2)} & u_{22}^{(2)} \end{pmatrix} = \left(1 - \frac{1}{v_2}\right) \cdot \begin{pmatrix} w_{11} & w_{12} \\ w_{21} & w_{22} \end{pmatrix}.$$

The realization of the different magnifications is illustrated in FIG. 5, which shows, in the motif plane 32, as first micromotif elements, dotted arrows 50 that are arranged in a first motif grid $U_1$ having a lattice period $p_1$, and which shows, as second micromotif elements, solid arrows 52 that are arranged at the same effective distance d from the lens plane 34 in a second motif grid $U_2$ having a somewhat larger lattice period $p_2$.

Due to the different lattice periods and the different magnification factors $v_1$ and $v_2$ resulting therefrom according to equation (1), the resulting magnified moiré images 54 and 56 float for the viewer 38 at different heights $Z_1$, $Z_2$ over the plane of the moirémagnification arrangement. The different magnification factors must, of course, also be taken into account in the design of the micromotif elements 50, 52. If the magnified arrow images 54 and 56 are, for example, to appear to be equally long, then the dotted arrows 50 in the motif plane 32 must be shortened appropriately compared with the solid arrows 52 to compensate for the higher magnification factor in the moiré image.

The depiction in FIG. 5, in which the moiré images float over the magnification arrangement, is valid for negative magnification factors; for positive magnification factors, accordingly, the moiré images appear for the viewer to float below the plane of the moiré magnification arrangement.

Generally, the transformation matrices $A_i$ include in each case, for a 3D moiré magnifier, a matching portion A' that describes rotations and distortions, as well as the in each case different magnification factors $v_i$ for the image planes:

$$A_i = v_i \cdot A' = v_i\begin{pmatrix} a'_{11} & a'_{12} \\ a'_{21} & a'_{22} \end{pmatrix}.$$

The principle equations of the 3D moiré magnifier now join the points $\vec{R}^{3D}$ in the moiréimage planes 36, 36' having the coordinates $\vec{r}$ of the points of the motif plane 32 via $$\vec{R}_i^{3D} = \begin{pmatrix} X_i \\ Y_i \\ Z_i \end{pmatrix} = v_i \cdot \begin{pmatrix} a'_{11} & a'_{12} & 0 \\ a'_{21} & a'_{22} & 0 \\ 0 & 0 & 1 \end{pmatrix} \cdot \begin{pmatrix} x_i \\ y_i \\ e \end{pmatrix}. \tag{2a}$$

or inversely $$v_i \cdot \begin{pmatrix} x_i \\ y_i \\ e \end{pmatrix} = \frac{1}{(a'_{11}a'_{22} - a'_{12}a'_{21})} \cdot \begin{pmatrix} a'_{22} & -a'_{12} & 0 \\ -a'_{21} & a'_{11} & 0 \\ 0 & 0 & 1 \end{pmatrix} \cdot \begin{pmatrix} X_i \\ Y_i \\ Z_i \end{pmatrix}. \tag{2b}$$

The special case described above of a pure magnification without rotation or distortion results as special case from equation (2a) in $$\vec{R}_i^{3D} = \begin{pmatrix} X_i \\ Y_i \\ Z_i \end{pmatrix} = \begin{pmatrix} v_i & 0 & 0 \\ 0 & v_i & 0 \\ 0 & 0 & v_i \end{pmatrix} \cdot \begin{pmatrix} x_i \\ y_i \\ e \end{pmatrix}. \tag{2c}$$

Based on the three-dimensional moiré image motif to be depicted, which is given by a point set (X, Y, Z), and a desired movement behavior of the moiré image, which is indicated in the manner described in greater detail below by the matrix A', the associated image points (x,y) in the motif plane and the associated magnification factor v can be calculated with the aid of the relationship (2b). The associated motif grid U is determined according to relationship (7), as indicated below.

Here, the points of the three-dimensional moiré image motif to be depicted that are to lie at the same height Z above or below the magnification arrangement can be combined since, due to Z=v*e, these points also entail identical magnification factors v and thus identical motif grid matrices. In other words, the motif image points corresponding to parallel intersections $Z_i$ in the moiré image motif can be arranged in corresponding motif grids $U_i$ that are to be created uniformly.

Especially two effects, which are referred to as "binocular vision" and "movement behavior", now contribute to a three-dimensional image effect for a viewer.

According to the effect of binocular vision, to the extent that the moiré magnifier is applied such that a lateral tilting of the arrangement leads to a lateral displacement of the image points, the magnified moiré image appears having a depth effect when viewed with both eyes. Due to the lateral "tilt angle" of about 15° between the eyes in the case of a normal viewing distance of about 25 cm, in the eyes, image points seen laterally displaced are, namely, interpreted by the brain as if the image points lay, depending on the direction of the lateral displacement, in front of or behind the actual substrate plane, and depending on the magnitude of the displacement, more or less high or low.

With the "movement behavior" effect is meant that, upon tilting a moiré magnifier that is constructed such that a lateral tilting of the arrangement leads to a displacement of the image point, previously covered posterior areas of the motif can become visible and the motif can thus be perceived three dimensionally.

A consistent three-dimensional image impression then results if the two effects have a similar impact, as in ordinary spatial vision.

In the special 3D moiré magnifiers, which are designed in accordance with the special case of the equation (2c), both effects do in fact have a similar impact, as shown below. Such 3D moiré magnifiers thus convey to the viewer a conventional, consistent three-dimensional image effect.

However, in general 3D moiré magnifiers that are not constructed according to the special case (2c), but rather in accordance with the general equations (2a) and (2b), the two effects "binocular vision" and "movement behavior" can lead to different or even contradictory visual impressions, with which striking and, for the viewer, almost dizzying effects having high attention and recognition value can be produced.

To achieve such visual effects, it is important to know and to systematically influence the movement behavior of the moiré image upon tilting the moiré magnification arrangements.

The columns of the transformation matrix A can be interpreted as vectors:

$$A = \begin{pmatrix} a_{11} & a_{12} \\ a_{21} & a_{22} \end{pmatrix}, \vec{a}_1 = \begin{pmatrix} a_{11} \\ a_{21} \end{pmatrix}, \vec{a}_2 = \begin{pmatrix} a_{12} \\ a_{22} \end{pmatrix}.$$

The vector $$\vec{a}_1 = \begin{pmatrix} a_{11} \\ a_{21} \end{pmatrix}$$

indicates in which direction the resulting moiré image moves if the arrangement composed of a motif grid and a lens grid is tilted laterally. The vector $$\vec{a}_2 = \begin{pmatrix} a_{12} \\ a_{22} \end{pmatrix}$$

indicates in which direction the resulting moiré image moves if the arrangement composed of a motif grid and a lens grid is tilted forward/backward. Here, the movement direction is defined as follows:

The angle $\beta_1$ in which the moiré image moves in relation to the horizontal if the arrangement is tilted laterally is given by $$\tan\beta_1 = \frac{a_{21}}{a_{11}}.$$

The angle $\beta_2$ in which the moiré image moves in relation to the horizontal if the arrangement is tilted forward/backward is given by $$\tan\beta_2 = \frac{a_{22}}{a_{12}}.$$

Coming back to the depiction in FIG. 4, the movement vector $$\vec{v} = \begin{pmatrix} v_x \\ v_y \end{pmatrix},$$

with which the three-dimensional moiré image 40 moves relative to a reference direction, for example the horizontal W, if the arrangement does not move in one of the preferred directions laterally (0° or forward/backward (90°, but rather is tilted in a general direction $\vec{k}$ that is indicated by an angle $\gamma$ to the reference direction W, is given by $$\vec{v} = \begin{pmatrix} v_x \\ v_y \end{pmatrix} = \begin{pmatrix} a_{11} & a_{12} \\ a_{21} & a_{22} \end{pmatrix} \cdot \begin{pmatrix} \cos\gamma \\ \sin\gamma \end{pmatrix} = \begin{pmatrix} a_{11}\cos\gamma + a_{12}\sin\gamma \\ a_{21}\cos\gamma + a_{22}\sin\gamma \end{pmatrix}. \tag{3a}$$

Thus, the angle $\beta_3$, in which the moiré image 40 moves in relation to the reference direction W if the moiré magnification arrangement is tilted in the general direction $\gamma$, is given by $$\tan\beta_3 = \frac{a_{21}\cos\gamma + a_{22}\sin\gamma}{a_{11}\cos\gamma + a_{12}\sin\gamma}. \tag{3b}$$

The spacing of a pair of points lying in the direction $\gamma$ in the motif plane 32 thus extends in the moiré image plane 36 in the direction $\beta_3$, magnified with the factor $$\begin{aligned} v &= \sqrt{v_x^2 + v_y^2} \\ &= \sqrt{(a_{11}\cos\gamma + a_{12}\sin\gamma)^2 + (a_{21}\cos\gamma + a_{22}\sin\gamma)^2}. \end{aligned} \tag{3c}$$

According to equation (1), the depicted moiré image 40 thus appears, in a 3D moirémagnifier constructed with the transformation matrix A with the effective distance e between the motif plane 32 and the lens plane 34, due to the parallax upon tilting the arrangement in the direction $\gamma$, to float at the height or depth $$Z_{movement} = v \cdot e = e \cdot \sqrt{(a_{11}\cos\gamma + a_{12}\sin\gamma)^2 + (a_{21}\cos\gamma + a_{22}\sin\gamma)^2} \tag{4}$$

above or below the substrate plane ("movement effect").

On the other hand, when viewed with both eyes with an eye separation direction that does not lie in the direction $\gamma$, only the component in the direction of the eye separation comes into play for the moiré magnification. If, for example, both eyes lie adjacent to one another in the x-direction, then a depth impression is created $$Z_{binocular} = v_x \cdot e = e \cdot (a_{11}\cos\gamma + a_{12}\sin\gamma). \tag{5}$$

The depth impression due to the movement effect, $Z_{movement}$, and the depth impression due to binocular vision, $Z_{binocular}$, thus differ for almost all eye separation directions. Thus, upon tilting in the direction $\gamma$, the moiré image 40 appears for the eyes to lie at another depth, namely at the depth $Z_{binocular}$, than the depth $Z_{movement}$ that suggests the parallax upon tilting.

In the above-mentioned special case $$A = v \cdot I = v\begin{pmatrix} 1 & 0 \\ 0 & 1 \end{pmatrix},$$

in other words $a_{11}=a_{22}=v$ and $a_{21}=a_{12}=0$, the values for $Z_{binocular}$ and $Z_{movement}$ coincide such that, there, binocular vision and the parallax upon tilting lead to the same depth impression and thus to a consistent three-dimensional image perception.

The preceding explanations relate, first, to the relationships for a motif point, a motif point set or a motif portion having a single depth component Z. To realize motif points or motif portions at different depths $Z_1$, $Z_2$ . . . , the motif points or motif portions provided for different depths in the motif plane are arranged, according to the present invention, in changed line screen spacings with a changed transformation matrix $A_1$, $A_2$ . . . . Here, the magnification factor $v_i$ of the different motif portions can be based in each case on the magnification factor v in the tilt direction according to equation (3c) and the original transformation matrix $$A = \begin{pmatrix} a_{11} & a_{12} \\ a_{21} & a_{22} \end{pmatrix}:$$

$$A_1 = \frac{v_1}{v}\begin{pmatrix} a_{11} & a_{12} \\ a_{21} & a_{22} \end{pmatrix},\ A_2 = \frac{v_2}{v}\begin{pmatrix} a_{11} & a_{12} \\ a_{21} & a_{22} \end{pmatrix},\ \text{etc.}$$

wherein $$Z_1 = v_1 \cdot e,\ Z_2 = v_2 \cdot e,\ \text{etc.}$$

In the terminology already used above, $A_i = v_i A'$, where A' is a matching portion, then A'=A/v. Similar to equations (4a), (4b), the points in the moiré image planes 36, 36' and the motif plane 32 are linked through $$\begin{pmatrix} X_1 \\ Y_1 \\ Z_1 \end{pmatrix} = \frac{v_1}{v} \cdot \begin{pmatrix} a_{11} & a_{12} & 0 \\ a_{21} & a_{22} & 0 \\ 0 & 0 & v \end{pmatrix} \cdot \begin{pmatrix} x_1 \\ y_1 \\ e \end{pmatrix} \tag{6a}$$

$$\begin{pmatrix} X_2 \\ Y_2 \\ Z_2 \end{pmatrix} = \frac{v_2}{v} \cdot \begin{pmatrix} a_{11} & a_{12} & 0 \\ a_{21} & a_{22} & 0 \\ 0 & 0 & v \end{pmatrix} \cdot \begin{pmatrix} x_2 \\ y_2 \\ e \end{pmatrix},\ \text{etc.}$$

or through $$\frac{v_1}{v}\begin{pmatrix} x_1 \\ y_1 \\ e \end{pmatrix} = \frac{1}{(a_{11}a_{22} - a_{12}a_{21})} \cdot \begin{pmatrix} a_{22} & -a_{12} & 0 \\ -a_{21} & a_{11} & 0 \\ 0 & 0 & 1 \end{pmatrix} \cdot \begin{pmatrix} X_1 \\ Y_1 \\ Z_1 \end{pmatrix} \tag{6b}$$

$$\frac{v_2}{v}\begin{pmatrix} x_2 \\ y_2 \\ e \end{pmatrix} = \frac{1}{(a_{11}a_{22} - a_{12}a_{21})} \cdot \begin{pmatrix} a_{22} & -a_{12} & 0 \\ -a_{21} & a_{11} & 0 \\ 0 & 0 & 1 \end{pmatrix} \cdot \begin{pmatrix} X_2 \\ Y_2 \\ Z_2 \end{pmatrix},\ \text{etc.}$$

The respective motif grids $U_1$, $U_2$, . . . result from the lens grid W and the transformation matrices $A_1$, $A_2$ . . . , with the aid of relationship (M2), in $$U_1 = \begin{pmatrix} u_{11}^{(1)} & u_{12}^{(1)} \\ u_{21}^{(1)} & u_{22}^{(1)} \end{pmatrix} = \left(\begin{pmatrix} 1 & 0 \\ 0 & 1 \end{pmatrix} - \frac{v}{v_1}A^{-1}\right) \cdot \begin{pmatrix} w_{11} & w_{12} \\ w_{21} & w_{22} \end{pmatrix} \tag{7}$$

$$U_2 = \begin{pmatrix} u_{11}^{(2)} & u_{12}^{(2)} \\ u_{21}^{(2)} & u_{22}^{(2)} \end{pmatrix} = \left(\begin{pmatrix} 1 & 0 \\ 0 & 1 \end{pmatrix} - \frac{v}{v_2}A^{-1}\right) \cdot \begin{pmatrix} w_{11} & w_{12} \\ w_{21} & w_{22} \end{pmatrix},\ \text{etc.}$$

Thus, according to the present invention, the following approach can be used to construct a motif image into a specified three-dimensional moiré image:

In addition to the lens grid W, for a reference point X,Y,Z of the desired three-dimensional moiré image, the transformation matrix A and a tilt direction γ are specified at which the parallax is to be viewed.

For these specifications, a magnification factor v is calculated with the aid of equation (3c). For further points of the moiré image, for example a general point $X_i$, $Y_i$, $Z_i$, the magnification factor $v_i$ is then determined for the Z-component $Z_i$ according to formula (6b), and the point coordinates in the image plane $x_i$, $y_i$, and according to formula (7), from the specified lens grid W, the transformation matrix A and the magnification factor $v_i$, the associated lattice arrangement $U_i$.

Since, here, depending on the position of $X_i$, $Y_i$, $Z_i$, different magnifications $v_i$ occur, it can happen that motif portions do not fit in a lattice cell of the motif grid $U_i$. In this case, the teaching of the German patent application with the title “Security Element,” DE 10 2007 029 203.3, filed simultaneously with this application, is followed, which relates to the distribution of a given motif element to multiple lattice cells.

Here, in particular, to produce a microoptical moiré magnification arrangement for depicting a moiré image having one or more moiré image elements, a motif image having a periodic or at least locally periodic arrangement of a plurality of lattice cells having micromotif image portions is produced in a motif plane, and a focusing element grid for the moiré-magnified viewing of the motif image having a periodic or at least locally periodic arrangement of a plurality of lattice cells having one microfocusing element each is produced and arranged spaced apart from the motif image. Here, taken together, the micromotif image portions are developed such that the micromotif image portions of multiple spaced-apart lattice cells of the motif image each form one micromotif element that corresponds to one of the moiré image elements of the magnified moiré image and whose dimension is larger than one lattice cell of the motif image. For further details of the approach, reference is made to the cited German patent application, the disclosure of which is incorporated herein by reference.

In the international application PCT/EP2006/012374, the disclosure of which is likewise incorporated herein by reference, moiré magnifiers having a cylindrical lens grid and/or having motifs stretched arbitrarily in one direction are described. Also such moiré magnifiers can be embodied as 3D moiré magnifiers.

In accordance with the explanations in PCT/EP2006/012374, in the case of the cylindrical lens 3D moiré magnifier, for the submatrix $(a_{ij})$ in formula (6a), the relationship:

$$\begin{pmatrix} a_{11} & a_{12} \\ a_{21} & a_{22} \end{pmatrix} = \frac{1}{D - u_{11}\cos\phi - u_{21}\sin\phi}\begin{pmatrix} D - u_{21}\sin\phi & u_{11}\sin\phi \\ u_{21}\cos\phi & D - u_{11}\cos\phi \end{pmatrix}$$

applies, wherein D is the cylindrical lens spacing and ϕ the inclination angle of the cylindrical lenses and $u_{ij}$ the matrix elements of the motif grid matrix.

In the case of the 3D moiré magnifier having expanded motifs, the submatrix $(a_{ij})$ in the formula (6a) acquires the form:

$$\begin{pmatrix} a_{11} & a_{12} \\ a_{21} & a_{22} \end{pmatrix} = \frac{1}{\mathrm{Det}(W - U)}\begin{pmatrix} \mathrm{Det}W + u_{21}w_{12} & -u_{11}w_{12} \\ u_{21}w_{22} & \mathrm{Det}W - u_{11}w_{22} \end{pmatrix}$$

-continued where $$U = \begin{pmatrix} u_{11} & 0 \\ u_{21} & 0 \end{pmatrix}$$

$(u_{11}, u_{21})$ being the translation vector for the expanded motif.

EXAMPLES

To illustrate the inventive approach, some concrete exemplary designs will now be described. For this, FIG. 6(*a*) shows a simple three-dimensional motif 60 in the form of a letter "P" carved out of a panel. FIG. 6(*b*) shows a depiction of this motif through only two parallel image planes that include the top 62 and the bottom 64 of the three-dimensional letters motif, FIG. 6(*c*) shows the depiction of the motif through five parallel section planes and with five sectional images 66 of the letter motif.

Since all essential method steps according to the present invention can already be explained quite descriptively based on a three-dimensional motif depicted in only two image planes, the following examples of such motifs are designed in accordance with FIG. 6(*b*). However, for the person of skill in the art, it will pose no difficulty to carry out the method also for a greater number of image planes, such as according to FIG. 6(*c*), or quasi continuously, according to FIG. 6(*a*). Especially in the case of more complex moiréimages, it is usually advantageous to start, not from areal sections, but rather from individual image points of the three-dimensional moiré image as the image components to be depicted, and as generally explained above in the description of the equations (6a), (6b) and (7), for each of these moiré image points, to determine an associated micromotif image point and a lattice cell arrangement for the repeated arrangement of the micromotif image point in the motif plane. In practice, the number of image planes that are used or the number of image points to be depicted that are used will also be based especially on the complexity of the desired three-dimensional motif.

Example 1

FIG. 7 shows an exemplary embodiment for which a hexagonal lens grid W is specified. As the three-dimensional motif to be depicted, an O-shaped ring is chosen that, as in FIG. 6(*b*), is described in two image planes by a letter top and letter bottom.

As the transformation matrices $A_i$, the matrices $$A_i = v_i \cdot \begin{pmatrix} 1 & 0 \\ 0 & 1 \end{pmatrix}$$

are specified that describe a pure magnification, wherein the magnification factor for the top areas is to be $v_1=16$ and the magnification factor for the bottom areas is to be $v_2=19$.

With this, in the case of a desired motif size of 50 mm, an effective lens image distance of e=4 mm and a lens spacing of 5 mm in the hexagonal lens grid, using the above-explained relationships (6b) and (7) for the motif size in the motif grid, a value of 50 mm/16=3.1 mm is obtained for the top areas and a value of 50 mm/19=2.63 mm for the bottom areas.

The grid spacing of the motif grid measures (1−1/16)*5 mm=4.69 mm for the top areas and (1−1/19)*5 mm=4.74 mm for the bottom areas. The perceived thickness of the three-dimensional moiré image measures (19−16)*4 mm=12 mm.

FIG. 7(*a*) shows the motif image 70 constructed in this way, in which the different line screen spacings of the two micromotif elements "ring top" and "ring bottom" are clearly perceptible. If the motif image 70 in FIG. 7(*a*) is viewed with the cited hexagonal lens grid, then a three-dimensional moiré image 72 floating below the moiré magnification arrangement results, of which a section is shown schematically in FIG. 7(*b*).

In the moiré image 72, multiple rings 74, 76 lying next to one another are perceptible. If the arrangement is viewed exactly from the front, then the middle ring 74 is seen from the front and the surrounding rings 76 diagonally from the corresponding side. If the arrangement is tilted, then the middle ring 74 can be seen diagonally from the side, and the rings 76 lying next to it change their perspective accordingly.

Example 2

FIG. 8 shows an exemplary embodiment having orthoparallactic movement, for which a rectangular lens grid W is chosen. A letter "P" carved out of a panel serves as the three-dimensional motif to be depicted, as illustrated in FIG. 6.

As the transformation matrices $A_i$, the matrices $$A_i = v_i \cdot \begin{pmatrix} 0 & 1 \\ 1 & 0 \end{pmatrix}$$

are specified that describe, in addition to a magnification by a factor $v_i$, an orthoparallactic movement behavior upon tilting the moiré magnification arrangement.

Equation (6a) is then represented in the form $$\begin{pmatrix} X_i \\ Y_i \\ Z_i \end{pmatrix} = \begin{pmatrix} 0 & v_i & 0 \\ v_i & 0 & 0 \\ 0 & 0 & v_i \end{pmatrix} \cdot \begin{pmatrix} x_i \\ y_i \\ e \end{pmatrix}$$

and equation (7) in the form $$U_i = \begin{pmatrix} u_{11}^{(i)} & u_{12}^{(i)} \\ u_{21}^{(i)} & u_{22}^{(i)} \end{pmatrix} = (I - A_i^{-1}) \cdot \begin{pmatrix} w_{11} & w_{12} \\ w_{21} & w_{22} \end{pmatrix}$$

where $$A_i^{-1} = \frac{1}{v_i} \cdot \begin{pmatrix} 0 & 1 \\ 1 & 0 \end{pmatrix}.$$

In this exemplary embodiment, the magnification factor for the top areas is to be $v_1=8$ and the magnification factor for the bottom areas $v_2=10$. Let the desired motif size (letter height) be 35 mm, the effective lens image distance again e=4 mm, and the lens spacing in the rectangular lens grid is to be 5 mm.

Thus, using the relationships (6b) and (7), for the motif size in the motif grid for the top areas, a value of 35 mm/8=4.375 mm results, and for the bottom areas, a value of 35 mm/10=3.5 mm.

The motif grid $U_1$ for the top areas results in $$U_1 = \begin{pmatrix} 5 & -0.625 \\ -0.625 & 5 \end{pmatrix},$$

the motif grid $U_2$ for the bottom areas in $$U_2 = \begin{pmatrix} 5 & -0.5 \\ -0.5 & 5 \end{pmatrix},$$

As usual, the motif elements that are applied in these grids are rotated and mirrored with respect to the desired target motif by the transformation $A^{-1}$. The perceived thickness of the three-dimensional moiré image is (10−8)*4 mm=8 mm.

FIG. 8(*a*) shows the motif image 80 constructed in this way, in which the two different motif grids $U_1$, $U_2$ of the two micromotif elements “letter top” and “letter bottom” are clearly perceptible. If the motif image 80 in FIG. 8(*a*) is viewed with the cited rectangular lens grid, then a three-dimensional moiré image 82 floating over the moirémagnification arrangement results, of which a section is shown schematically in FIG. 8(*b*).

If the moiré magnification arrangement is tilted horizontally (tilt direction 84), then the motif is looked at from above or from below, if the arrangement is tilted vertically (tilt direction 86), then the motif is looked at laterally such that the impression is created that the motif is spatially stretched and lies in the depth.

Through binocular vision, however, this depth impression is not confirmed, since no x-component for lateral movement is present, the motif remains in the substrate plane. This perception contradiction is extremely striking and thus has a high attention and recognition value for the viewer.

Example 3

Like the exemplary embodiment in FIG. 8, the exemplary embodiment in FIG. 9 starts from a letter “P” carved out of a panel as the three-dimensional motif to be depicted. In this exemplary embodiment, this motif is to move diagonally upon tilting the moirémagnification arrangement.

As the transformation matrices $A_i$, the matrices $$A_i = v_i \cdot \begin{pmatrix} 1 & 0 \\ 1 & 1 \end{pmatrix},$$

are specified that describe, in addition to a magnification by the factor $v_i$, a diagonal movement behavior upon tilting the moiré magnification arrangement.

Equation (6a) is then represented in the form $$\begin{pmatrix} X_i \\ Y_i \\ Z_i \end{pmatrix} = \begin{pmatrix} v_i & 0 & 0 \\ v_i & v_i & 0 \\ 0 & 0 & v_i \end{pmatrix} \cdot \begin{pmatrix} x_i \\ y_i \\ e \end{pmatrix}$$

and equation (7) in the form $$U_i = \begin{pmatrix} u_{11}^{(i)} & u_{12}^{(i)} \\ u_{21}^{(i)} & u_{22}^{(i)} \end{pmatrix} = (I - A_i^{-1}) \cdot \begin{pmatrix} w_{11} & w_{12} \\ w_{21} & w_{22} \end{pmatrix}$$

where $$A_i^{-1} = \frac{-1}{v_i} \cdot \begin{pmatrix} 1 & 0 \\ -1 & 1 \end{pmatrix}.$$

Also in this exemplary embodiment, the magnification factor for the top areas is to be $v_1$=8 and the magnification factor for the bottom areas $v_2$=10, the desired motif size (letter height) is to be 35 mm, the effective lens image distance e=4 mm and the lens spacing in the likewise rectangular lens grid 5 mm.

Thus, using the relationships (6b) and (7), for the motif size in the motif grid for the top areas, a value of 35 mm/8=4.375 mm results, and for the bottom areas, a value of 35 mm/10=3.5 mm.

The motif grid $U_1$ for the top areas results in $$U_1 = \begin{pmatrix} 4.375 & 0 \\ 0.625 & 4.375 \end{pmatrix},$$

the motif grid $U_2$ for the bottom areas in $$U_2 = \begin{pmatrix} 4.5 & 0 \\ 0.5 & 4.5 \end{pmatrix}.$$

As usual, the motif elements that are applied in these grids are distorted with respect to the desired target motif by the transformation $$A_i^{-1} = \frac{1}{v_i} \cdot \begin{pmatrix} 1 & 0 \\ -1 & 1 \end{pmatrix}.$$

The perceived thickness of the three-dimensional moiré image is (10−8)*4 mm=8 mm.

FIG. 9(*a*) shows the motif image 90 constructed in this way, in which the two different motif grids $U_1$, $U_2$ of the two micromotif elements “letter top” and “letter bottom” and the distortion of the motif elements are clearly perceptible.

If the motif image 90 in FIG. 9(*a*) is viewed with the cited rectangular lens grid, then a three-dimensional moiré image 92 floating below the moiré magnification arrangement results, of which a section is shown schematically in FIG. 9(*b*).

If the moiré magnification arrangement is tilted horizontally, then the motif is looked at diagonally at a 45° angle. If the arrangement is tilted vertically, then the motif is looked at from above or below such that the impression is created that the motif is spatially stretched and lies in the depth. Through binocular vision, however, the depth impression is not fully confirmed. According to this depth impression, the motif does not lie as deep as the tilt effect simulates because, for the depth impression in the case of binocular vision, only the x-component of the diagonal movement has an impact.

Example 4

Example 4 is a modification of example 3, and is designed in its dimensions such that it is suitable especially for security threads of banknotes.

The moiré image (letter "P") used and the transformation matrices $A_i$ correspond to those from example 3. In this exemplary embodiment, however, the magnification factors for the top areas are to be $v_1=80$ and for the bottom areas $v_2=100$, and the motif size (letter height) is to be 3 mm. e=0.04 mm is chosen as the effective lens image distance and a value of 0.04 mm as the lens spacing in the rectangular lens grid.

Thus, again using the relationships (6b) and (7), for the motif size in the motif grid for the top areas, a value of 3 mm/80=0.0375 mm results, and for the bottom areas, a value of 3 mm/100=0.03 mm.

The motif grid $U_1$ for the top areas results in $$U_1 = \begin{pmatrix} 0.0395 & 0 \\ 0.0005 & 0.0395 \end{pmatrix},$$

the motif grid $U_2$ for the bottom areas in $$U_2 = \begin{pmatrix} 0.0396 & 0 \\ 0.0004 & 0.0396 \end{pmatrix}.$$

The motif elements that are applied in these grids are likewise distorted with respect to the desired target motif by the transformation $$A_i^{-1} = \frac{1}{v_i} \cdot \begin{pmatrix} 1 & 0 \\ -1 & 1 \end{pmatrix}.$$

The perceived thickness of the three-dimensional moiré image is (100−80)*0.04 mm=0.8 mm.

If the user tilts a banknote having an appropriately furnished security thread horizontally, then he looks at the motif diagonally at a 45° angle. If he tilts the arrangement vertically, then he looks at the motif from above or below such that the impression is created that the motif is spatially stretched and lies in the depth. Through binocular vision, however, the depth impression is not fully confirmed. According to this depth impression, the motif does not lie as deep as the tilt effect simulates because, for the depth impression in the case of binocular vision, only the x-component of the diagonal movement has impact.

This contradiction in the depth perception is extremely striking and thus has a high attention and recognition value for the viewer.

As already mentioned in the description of FIG. 4, different Z-values can also be achieved in a three-dimensional moiré image in that, in the case of a constant moirémagnification v, different values are realized for the effective distance e between the lens plane and the motif plane.

Here, the realization of different magnifications is illustrated in FIG. 10, which shows two motif planes 32, 32' that are provided at different depths $d_1$, $d_2$ of the moiré magnification arrangement. As first micromotif elements, dotted arrows 50 are shown in the motif plane 32, and as second micromotif elements, solid arrows 52 in the lower-lying motif plane 32'. Both the first and the second micromotif elements 50, 52 are arranged in the same motif grid U having the lattice period u.

Due to the matching lattice periods, the resulting magnified moiré images 54 and 56 thus appear to the viewer 38 to have the same magnification factor v such that the arrows 50, 52 are formed to be equally long for equally long magnified arrow images 54 and 56.

In this embodiment, the different floating height $Z_1$ or $Z_2$ above the plane of the moirémagnification arrangement results from the different spacing $d_1$, $d_2$ and thus also a different effective distance $e_1$, $e_2$ between the lens plane 34 and the motif plane 32 or 32':

$$Z_1=v*e_1, Z_2=V*e_2.$$

Such a design can be realized with motif elements 50, 52 at different depths, for example by embossing the corresponding patterns in a lacquer layer. Here, the effective distances $e_1$, $e_2$ effective for the floating height Z can be identified in each case from the physical spacing $d_1$, $d_2$, the diffraction index of the optical spacing layer and of the lens material, and the lens focal length.

Analogously to FIG. 5, the depiction in FIG. 10, in which the moiré images float over the magnification arrangement, is valid for negative magnification factors; for positive magnification factors, the moiré images appear for the viewer to float below the plane of the moiré magnification arrangement.

The invention claimed is:

1. A security element for security papers or value documents, having a microoptical moiré magnification arrangement for depicting a three-dimensional moiré image, having a pattern that extends into the depth of space, that includes, in at least two moiré image planes spaced apart in a direction normal to the moiré magnification arrangement, image components to be depicted, having

- a motif image that includes two or more periodic or at least locally periodic lattice cell arrangements having different lattice periods and/or different lattice orientations that are each allocated to one moiré image plane and that include micromotif image components for depicting the image component of the allocated moiré image plane,
- for the moiré-magnified viewing of the motif image, a focusing element grid that is arranged spaced apart from the motif image and that includes a periodic or at least locally periodic arrangement of a plurality of lattice cells having one microfocusing element each, wherein, for almost all tilt directions, upon tilting the security element, the magnified, three-dimensional moiré image moves in a moiré movement direction that differs from the tilt direction.

2. The security element according to claim 1, characterized in that, due to the parallax upon tilting the security element, for the viewer, the three-dimensional moiré image appears floating at a first height or depth above or below the plane of the security element, and due to the eye separation in binocular vision, at a second height or depth above or below the plane of the security element, the first and second height or depth differing for almost all viewing directions.

3. The security element according to claim 1, characterized in that both the lattice cell arrangements of the motif image and the lattice cells of the focusing element grid are arranged periodically.

4. The security element according to claim 1, characterized in that, locally, both the lattice cell arrangements of the motif image and the lattice cells of the focusing element grid are arranged periodically, the local period parameters changing only slowly in relation to the periodicity length.

5. The security element according to claim 3, characterized in that the periodicity length or the local periodicity length is between 3 μm and 50 μm, preferably between 5 μm and 30 μm, particularly preferably between about 10 μm and about 20 μm.

6. The security element according to claim 1, characterized in that the lattice cell arrangements of the motif image and the lattice cells of the focusing element grid form, at least locally, one two-dimensional Bravais lattice each.

7. The security element according to claim 1, characterized in that the microfocusing elements are formed by non-cylindrical microlenses or concave microreflectors, especially by microlenses or concave microreflectors having a circular or polygonally delimited base area.

8. The security element according to claim 1, characterized in that the microfocusing elements are formed by elongated cylindrical lenses or concave cylindrical reflectors whose dimension in the longitudinal direction measures more than 250 μm, preferably more than 300 μm, particularly preferably more than 500 μm and especially more than 1 mm.

9. The security element according to claim 1, characterized in that the total thickness of the security element is below 50 μm, preferably below 30 μm.

10. The security element according to claim 1, characterized in that the moiré image includes a three-dimensional depiction of an alphanumeric character string or of a logo.

11. The security element according to claim 1, characterized in that the micromotif image components are present in a printing layer.

12. A security element for security papers or value documents, having a microoptical moiré magnification arrangement for depicting a three-dimensional moiré image, having a pattern that extends into the depth of space, that includes, in at least two moiré image planes spaced apart in a direction normal to the moiré magnification arrangement, image components to be depicted, having a motif image that includes, arranged at different heights, two or more periodic or at least locally periodic lattice cell arrangements that are each allocated to one moiré image plane and that include micromotif image components for depicting the image component of the allocated moiré image plane, for the moiré-magnified viewing of the motif image, a focusing element grid that is arranged spaced apart from the motif image and that includes a periodic or at least locally periodic arrangement of a plurality of lattice cells having one microfocusing element each, wherein, for almost all tilt directions, upon tilting the security element, the magnified, three-dimensional moiré image moves in a moiré movement direction that differs from the tilt direction.

13. The security element according to claim 12, characterized in that the lattice cell arrangements of the motif image exhibit identical lattice periods and identical lattice orientations.

14. The security element according to claim 12, characterized in that the micromotif image components are present in an embossing layer at different embossing heights.

15. The security element according to claim 1, characterized in that the security element exhibits an opaque cover layer to cover the moiré magnification arrangement in some regions.

16. The security element according to claim 1, characterized in that the motif image and the focusing element grid are arranged at opposing surfaces of an optical spacing layer.

17. The security element according to claim 1, characterized in that the focusing element grid is provided with a protective layer whose refractive index differs from the refractive index of the microfocusing elements preferably by at least 0.3.

18. The security element according to claim 1, characterized in that the security element is a security thread, a tear strip, a security band, a security strip, a patch or a label for application to a security paper or value document.

19. A method for manufacturing a security element having a microoptical moiré magnification arrangement for depicting a three-dimensional moiré image having a pattern that extends into the depth of space, that includes, in at least two moiré image planes spaced apart in a direction normal to the moiré magnification arrangement, image components to be depicted, in which in a motif plane, a motif image is produced that includes two or more periodic or at least locally periodic lattice cell arrangements having different lattice periods and/or different lattice orientations that are each allocated to one moiré image plane and that are provided with micromotif image components for depicting the image component of the allocated moiré image plane, a focusing element grid for the moiré-magnified viewing of the motif image, having a periodic or at least locally periodic arrangement of a plurality of lattice cells having one microfocusing element each, is produced and arranged spaced apart from the motif image, the lattice cell arrangements of the motif plane, the micromotif image components and the focusing element grid being coordinated such that, for almost all tilt directions, upon tilting the security element, the magnified, three-dimensional moiré image moves in a moiré movement direction that differs from the tilt direction.

20. A method for manufacturing a security element having a microoptical moiré magnification arrangement for depicting a three-dimensional moiré image having a pattern that extends into the depth of space, that includes, in at least two moiré image planes spaced apart in a direction normal to the moiré magnification arrangement, image components to be depicted, in which a motif image is produced having, arranged at different heights, two or more motif planes that each include a periodic or at least locally periodic lattice cell arrangement that is allocated to one moiré image plane and that is provided with micromotif image components for depicting the image component of the allocated moiré image plane, a focusing element grid for the moiré-magnified viewing of the motif image, having a periodic or at least locally periodic arrangement of a plurality of lattice cells having one microfocusing element each, is produced and arranged spaced apart from the motif image, the lattice cell arrangements of the motif planes, the micromotif image components and the focusing element grid being coordinated such that, for almost all tilt directions, upon tilting the security element, the magnified, three-dimensional moiré image moves in a moiré movement direction that differs from the tilt direction.

21. The method according to claim 20, characterized in that the lattice cell arrangements of the motif planes are produced having identical lattice periods and identical lattice orientations.

22. The method according to claim 20, characterized in that the motif image is embossed to produce micromotif image components at different embossing heights.

23. A method for manufacturing a security element having a microoptical moiré magnification arrangement for depicting a three-dimensional moiré image having a pattern that extends into the depth of space, that includes, in at least two moiré image planes spaced apart in a direction normal to the moiré magnification arrangement, image components to be depicted, in which a) a desired three-dimensional moiré image that is visible when viewed is defined as the target motif, b) a periodic or at least locally periodic arrangement of microfocusing elements is defined as the focusing element grid, c) a desired magnification and a desired movement of the visible three-dimensional moiré image when the moiré magnification arrangement is tilted laterally and when tilted forward/backward is defined, d) for each image component to be depicted, the associated micromotif image component for depicting this image component of the three-dimensional moiré image, as well as the associated lattice cell arrangement for the arrangement of the micromotif image components in the motif plane, are calculated from the spacing of the associated moiré image plane from the moiré magnification arrangement, the defined magnification and movement behavior, and the focusing element grid, and e) the micromotif image components calculated for each image component to be depicted are composed to form a motif image that is to be arranged in the motif plane according to the associated lattice cell arrangement.

24. The method according to claim 23, characterized in that, in step c), further, for a reference point of the three-dimensional moiré image, a tilt direction γ is specified in which the parallax is to be viewed, and a desired magnification and movement behavior for this reference point and the specified tilt direction, and in that, for the other points of the three-dimensional moiré image, the moiré magnification factors in step d) are based on the specified magnification factor for the reference point and the specified tilt direction.

25. The method according to claim 24, characterized in that the desired magnification and movement behavior for the reference point is specified in the form of the matrix elements of a transformation matrix $$A = \begin{pmatrix} a_{11} & a_{12} \\ a_{21} & a_{22} \end{pmatrix}$$

and the magnification factor for the reference point is calculated from the transformation matrix A and the tilt direction y using the relationship $$v = \sqrt{v_x^2 + v_y^2} = \sqrt{(a_{11}\cos\gamma + a_{12}\sin\gamma)^2 + (a_{21}\cos\gamma + a_{22}\sin\gamma)^2}.$$

26. The method according to claim 25, characterized in that, in step d), for further points $(X_i, Y_i, Z_i)$ of the three-dimensional moiré image, the magnification factors $v_i$ and the associated point coordinates in the motif plane $(x_i, y_i)$ are calculated using the relationship $$\begin{pmatrix} X_i \\ Y_i \\ Z_i \end{pmatrix} = \frac{v_i}{v} \cdot \begin{pmatrix} a_{11} & a_{12} & 0 \\ a_{21} & a_{22} & 0 \\ 0 & 0 & v \end{pmatrix} \cdot \begin{pmatrix} x_i \\ y_i \\ e \end{pmatrix}$$

or its inverse $$\frac{v_i}{v}\begin{pmatrix} x_i \\ y_i \\ e \end{pmatrix} = \frac{1}{(a_{11}a_{22} - a_{12}a_{21})} \cdot \begin{pmatrix} a_{22} & -a_{12} & 0 \\ -a_{21} & a_{11} & 0 \\ 0 & 0 & 1 \end{pmatrix} \cdot \begin{pmatrix} X_i \\ Y_i \\ Z_i \end{pmatrix},$$

where e denotes the effective distance of the focusing element grid from the motif plane.

27. The method according to claim 26, characterized in that the focusing element grid in step b) is specified by a grid matrix W, and in step d), the points of the motif plane belonging to a magnification $v_i$ are each combined to form a micromotif image component, and for this micromotif image component, a motif grid $U_i$ is calculated for arranging this micromotif image component periodically or at least locally periodically using the relationship $$\overleftrightarrow{U}_i = (\overleftrightarrow{I} - \overleftrightarrow{A}_i^{-1}) \cdot \overleftrightarrow{W},$$

the transformation matrices $A_i$ being given by $$A_i = \frac{v_i}{v}\begin{pmatrix} a_{11} & a_{12} \\ a_{21} & a_{22} \end{pmatrix}$$

and $\overleftrightarrow{A}_i^{-1}$ denoting the inverse matrices.

28. The method according to claim 27, characterized in that the focusing element grid in step b) is specified in the form of a two-dimensional Bravais lattice having the grid matrix $$\overleftrightarrow{W} = \begin{pmatrix} w_{11} & w_{12} \\ w_{21} & w_{22} \end{pmatrix},$$

$w_{1i}$, $w_{2i}$ representing the components of the lattice cell vectors $\vec{w}_i$ where i=1,2.

29. The method according to claim 27, characterized in that, for manufacturing a cylindrical lens 3D moiré magnifier, in step b), a cylindrical lens grid is specified by the grid matrix $$W = \begin{pmatrix} \cos\phi & -\sin\phi \\ \sin\phi & \cos\phi \end{pmatrix} \cdot \begin{pmatrix} D & 0 \\ 0 & \infty \end{pmatrix}$$

or $$W^{-1} = \begin{pmatrix} 1/D & 0 \\ 0 & 0 \end{pmatrix} \cdot \begin{pmatrix} \cos\phi & \sin\phi \\ -\sin\phi & \cos\phi \end{pmatrix},$$

where D denotes the lens spacing and ϕ the orientation of the cylindrical lenses.

30. The method according to claim 19, characterized in that the motif grid lattice cells and the focusing element grid lattice cells are described by vectors $\vec{u}_1$ and $\vec{u}_2$ (or $\vec{u}_1^{(i)}$ and $\vec{u}_2^{(i)}$ in the case of multiple motif grids $U_i$) and $\vec{w}_1$ and $\vec{w}_2$ and are modulated location dependently, the local period parameters $|\vec{u}_1|$, $|\vec{u}_2|$, $\angle(\vec{u}_1, \vec{u}_2)$ and $|\vec{w}_1|$, $|\vec{w}_2|$, $\angle(\vec{w}_1, \vec{w}_2)$ changing only slowly in relation to the periodicity length.

31. The method according to claim 19, characterized in that the motif image and the focusing element grid are arranged at opposing surfaces of an optical spacing layer.

32. The method according to claim 19, characterized in that the focusing element grid is provided with a protective layer whose refractive index differs from the refractive index of the microfocusing elements preferably by at least 0.3.

33. The method according to claim 19, characterized in that the motif image is printed on a substrate, the micromotif elements formed from the micromotif image portions constituting microcharacters or micropatterns.

34. The method according to claim 19, characterized in that the security element is further provided with an opaque cover layer to cover the moiré magnification arrangement in some regions.

35. The method according to claim 19, characterized in that the image components of the three-dimensional moiré image to be depicted are formed by individual image points, a group of image points, lines or areal sections.

36. A security paper for manufacturing security or value documents, such as banknotes, checks, identification cards, or certificates, that is furnished with the security element according to claim 1.

37. The security paper according to claim 36, characterized in that the security paper comprises a carrier substrate composed of paper or plastic.

38. A data carrier having the security element according to claim 1.

39. The data carrier according to claim 38, characterized in that the security element is arranged in a window region of the data carrier.

40. The data carrier of claim 38, wherein the data carrier is a branded article, value document or a decorative article.

* * * * *